(12) United States Patent
Cahill et al.

(10) Patent No.: US 8,780,163 B2
(45) Date of Patent: Jul. 15, 2014

(54) PLATFORM FOR PSEUDO-ANONYMOUS VIDEO CHAT WITH INTELLIGENT MATCHING OF CHAT PARTNERS

(75) Inventors: Matt Cahill, San Francisco, CA (US); Shawn D. Fanning, San Francisco, CA (US); Mark Jen, San Francisco, CA (US); Joey Liaw, San Francisco, CA (US); Sean Parker, New York, NY (US)

(73) Assignee: Airtime Media, Inc., San Francisco, CA (US)

( * ) Notice: Subject to any disclaimer, the term of this patent is extended or adjusted under 35 U.S.C. 154(b) by 267 days.

(21) Appl. No.: 13/403,796

(22) Filed: Feb. 23, 2012

(65) Prior Publication Data

US 2012/0236103 A1 Sep. 20, 2012

Related U.S. Application Data

(60) Provisional application No. 61/446,004, filed on Feb. 23, 2011.

(51) Int. Cl.
*H04N 7/14* (2006.01)
*G06Q 50/00* (2012.01)
*G06Q 10/10* (2012.01)
*H04L 12/58* (2006.01)
*H04L 12/18* (2006.01)

(52) U.S. Cl.
CPC ............ *H04N 7/147* (2013.01); *H04L 12/1818* (2013.01); *G06Q 50/01* (2013.01); *G06Q 10/101* (2013.01); *H04L 51/32* (2013.01)
USPC ...................................... 348/14.01; 709/204

(58) Field of Classification Search
USPC .............................. 348/14.01–14.16; 709/204
See application file for complete search history.

(56) References Cited

U.S. PATENT DOCUMENTS

| 6,665,389 | B1 | 12/2003 | Haste, III | |
|---|---|---|---|---|
| 7,882,039 | B2 * | 2/2011 | Weiss et al. | 705/319 |
| 2006/0143214 | A1 * | 6/2006 | Teicher | 707/101 |
| 2007/0162569 | A1 * | 7/2007 | Robinson et al. | 709/219 |
| 2008/0059580 | A1 | 3/2008 | Kalinowski et al. | |

(Continued)

FOREIGN PATENT DOCUMENTS

| JP | 2001222498 A | 8/2001 |
|---|---|---|
| WO | WO-2012116197 A2 | 8/2012 |

OTHER PUBLICATIONS

International Search Report of PCT/US2012/026345 dated Sep. 27, 2012, pp. 1-10.

*Primary Examiner* — Stella Woo
(74) *Attorney, Agent, or Firm* — Perkins Coie, LLP

(57) ABSTRACT

A computer-implemented method and system of providing live video chats in a network are described. The method may include: providing a first interface for a user to generate a user profile; generating a list of pseudo-anonymous chat partners according to a matching algorithm that involves the information of the user profile; providing a second interface for the user to select a chat partner on the list of pseudo-anonymous chat partners, and initiate a video call to the chat partner; establishing a video chat session between said user and said chat partner; providing a third interface for the user and the chat partner to add to and/or modify their respective profiles while the video chat session is in progress; and providing a fourth interface for the user and said chat partner to rate each other during the video chat session and/or after the video chat session.

73 Claims, 21 Drawing Sheets

(56) References Cited

U.S. PATENT DOCUMENTS

| | | |
|---|---|---|
| 2010/0057857 A1 | 3/2010 | Szeto |
| 2010/0077032 A1* | 3/2010 | Drennan et al. .............. 709/206 |
| 2011/0072366 A1* | 3/2011 | Spencer et al. ............... 715/757 |
| 2011/0252340 A1* | 10/2011 | Thomas ........................ 715/756 |
| 2012/0089623 A1* | 4/2012 | Sobotka et al. ............... 707/751 |
| 2013/0031475 A1* | 1/2013 | Maor et al. .................... 715/706 |
| 2013/0317908 A1* | 11/2013 | Kanigsberg et al. ....... 705/14.53 |

* cited by examiner

Guiding Users to Add Interests

WebChat http://www.webchat.com/

*WebChat*

User A | Sign Out

User A
Pasadena, CA

| Pizza | Black Swan |
| Nicki Minaj | Design |
| Twitter | Warcraft |

User C
Cedar Rapids, IA

| Android | Apple Inc. |
| True Grit | Design |
| World Cup | FSM |
| Warcraft |

Share Video

User A and User C started to chat.
- We couldn't find anyone within 500 miles of Pasadena, CA, so we expanded the search to 5000 miles. [Change location settings] to find people elsewhere.
- Add more interests to find better matches with you.

> Users get better matches when they have more interests. Initially interests are pulled from Facebook, but sometimes users need to add more themselves. The product warns users of low-quality matches and how to fix it.

Next

Type to chat

*FIG. 13*

PLATFORM FOR PSEUDO-ANONYMOUS VIDEO CHAT WITH INTELLIGENT MATCHING OF CHAT PARTNERS

CROSS-REFERENCE TO RELATED APPLICATIONS

This application claims the benefit of priority under 35 U.S.C. 119(e) to U.S. Provisional Patent Application Ser. No. 61/446,004 filed Feb. 23, 2011, entitled "PLATFORM FOR PSEUDO-ANONYMOUS DUAL-USER VIDEO CHAT WITH INTELLIGENT MATCHING OF CHAT PARTNERS" which is incorporated herein by reference in its entirety.

FIELD OF THE INVENTION

At least one embodiment of the present disclosure pertains to facilitating communications over a web-based network, and more particularly, to communications between pseudo-anonymous users of the web-based network.

BACKGROUND

In recent years, web-based social networking is exploding. Facebook, a social networking service company, announced in February 2012, that it had 845 million monthly active users and 425 million mobile users at the end of December 2011. On average in December 2011, there were 483 million daily active users on Facebook®. It was predicted that Facebook® would pass the milestone of 1 billion monthly active users some time in 2012.

In social networking platforms, such as Facebook®, LinkedIn®, MySpace®, etc, users may add colleagues, family members, and known friends to their contact lists. The users may send text messages, and make audio or video calls to other known users on the same platform. The social networking platforms allow their users to establish and/or maintain connections with members of a previously inhabited community. In addition, the platforms may be used to support relationships and keep users in contact, even when life changes, move them away from each other.

One problem with the existing social networking platforms is that they are mainly focused in reinforcing the old relationships and address little of many users' needs to meet people outside the social graph. For example, it's very difficult for a LinkedIn® or Facebook® user to reach out to new people that don't have any friends in common. On the other hand, the voyeuristic sites, such as Chatroulette® etc., don't seem to provide an effective solution. These sites introduce new people by randomly pairing users in video chat rooms. Although the random pairing eliminates the anxiety of meeting new people, the relationships created by such random parings seem to be too random and fleeting.

In consequence, the present inventors have recognized that there is value in providing network users a platform to build new relationships outside their social graphs by breaking down social boundaries between different social graphs. The present inventors have identified a need to provide a universal platform that is introducing people and bringing together people with common interests in particular topics, and/or having other commonalities.

BRIEF DESCRIPTION OF THE DRAWINGS

One or more embodiments of the present disclosure are illustrated by way of example and not limitation in the figures of the accompanying drawings, in which like references indicate similar elements.

FIG. 13 illustrates an example of user interface of a video-chat session in the chat platform which enables a new user in the chat session to specify their interests/topics or connect to an existing account through another service, according to yet another embodiment(s) of the present disclosure.

DETAILED DESCRIPTION

Figure 1:
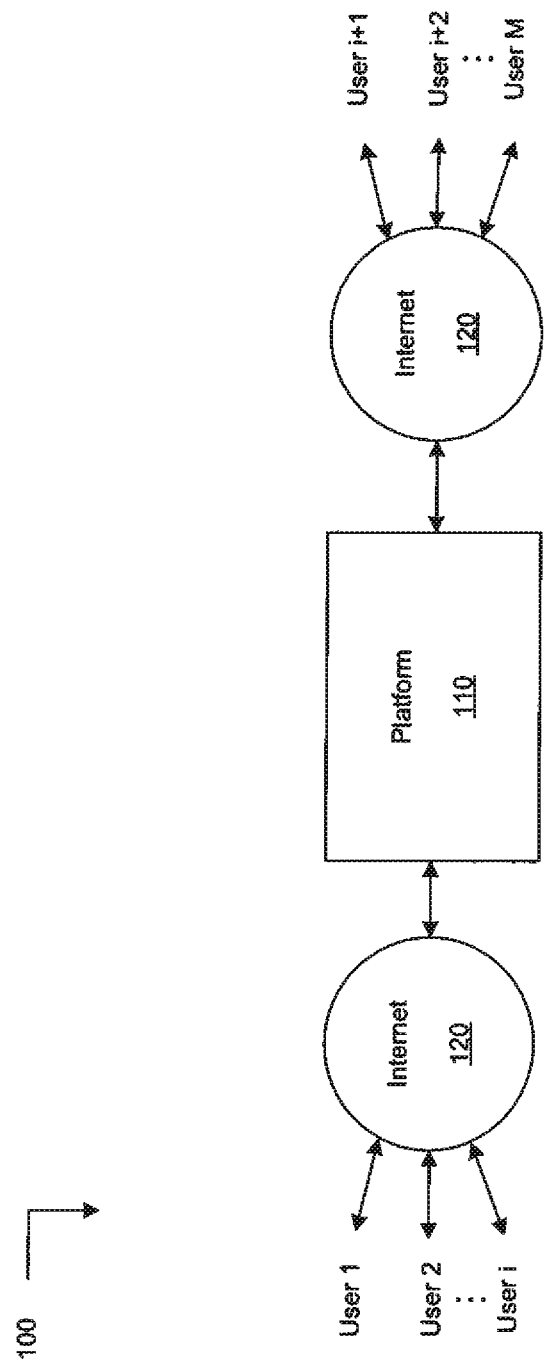
FIG. 1 illustrates a schematic block diagram of a system for pseudo-anonymous chat with intelligent matching of chat partners according to one embodiment(s) of the present disclosure.

The following description and drawings are illustrative and are not to be construed as limiting. Numerous specific details are described to provide a thorough understanding of the disclosure. However, in certain instances, well-known or details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates a schematic block diagram of a system 100 for pseudo-anonymous chat with intelligent matching of chat partners, according to one embodiment(s) of the present disclosure. The system 100 may include a platform 110. The platform 110 may include one or more server computers that are coupled to Internet 120. Each server computer may have one or more IP addresses. In some implementations, the multiple server computers may be located at the same physical location. In some implementations, the multiple server computers may be located at multiple physical locations.

In the platform 110, each new user may be provided an option(s) to generate a user profile. The user profile may include, by way of example, but not limitation, the personal information, likes/interests, physical address, etc. In some implementations, the user may be provided an option(s) to connect the user profile to user's existing social media account(s), such as the user's Facebook® account, and/or Google® account etc. The platform 110 may be configured to automatically update the user profile in the platform 110 by bringing in updates of the user's Facebook® account, and/or Google® account etc.

In some implementations, the platform 110 may be configured to automatically provide a list of pseudo-anonymous chat partners to the user. The list of pseudo-anonymous chat partners may be generated from a plurality of online users according to a matching algorithm that involves the information of the user's profile. In some implementations, a processor(s) of the platform 110 may be configured to execute programs to record and monitor each user's behavior in the platform 110. For example, the length of a user's conversations and the common interests between the user and its chat partners may be monitored and recorded.

In some implementations, the matching algorithm may include a scoring algorithm. A user may be assigned with an affinity score according to at least the user's average conversation length with its chat partners. The user may be matched to a list of pseudo-anonymous chat partners, each of which may have the same or a similar affinity score as that of the user.

In some implementations, a user may be provided an option(s) to select search criteria in generating the list of pseudo-anonymous chat partners. For example, if a user has interests in talking with a chat partner with the same age and living in the same area, the user may be provided option(s) to select "close to me" and "same age" as searching criteria. Available pseudo-anonymous users may be filtered by these two parameters first. If no matches can be found, then relaxed constraints may be applied to perform successive searches. If two pseudo-anonymous users have been successfully matched and engaged into a video chat, age and location delta information may be printed to a chat log and made visible to both chat participants.

In some implementations, a plurality of factors may be considered by the matching algorithm. The factors may include, by way of example, but not limitation, user's ranking, common interests, related interests in common, thumbs-up the same videos in the past, sharing the same pseudo-anonymous chat partner(s) in contact list, duration of conversation, shared friends, mutual friending, taking of likes or videos, and not having friends in common on Facebook® or other social media. For example, two matched users may share the same interest, i.e. "watching movies", and/or have related interests in common, i.e. actress "Anne Hathaway" in the upcoming movie The Dark Knight Rises™. In some implementations, each of the plurality of factors may be assigned with a corresponding weight in generating the list of pseudo-anonymous chat partners for the user.

In some implementations, the factors considered under the matching algorithm may be dynamically constructed or expanded using machine learning algorithm. For example, the length of conversations and the commonalities between chat partners may be monitored and analyzed. If it is determined that a user is more likely engaging long conversation(s) with chat partners having particular common interests and/or commonalities as the user, these particular common interests and/or commonalities may be assigned with more weight(s) in generating a future list of pseudo-anonymous chat partners for the user.

In some implementations, two pseudo-anonymous users may be prevented from being matched under certain circumstances. For example, a user may not be randomly matched to the same pseudo-anonymous user more than once per hour. For another example, a user may not be matched to a person that the user has blocked in the past.

In some implementations, the platform 110 may be configured to examine a user's profile to select one or more advertisements to display to the user according to the pattern of the user's profile. The advertisement(s) may be non-intrusively displayed on the user interface(s) after the user's login.

Figure 2:
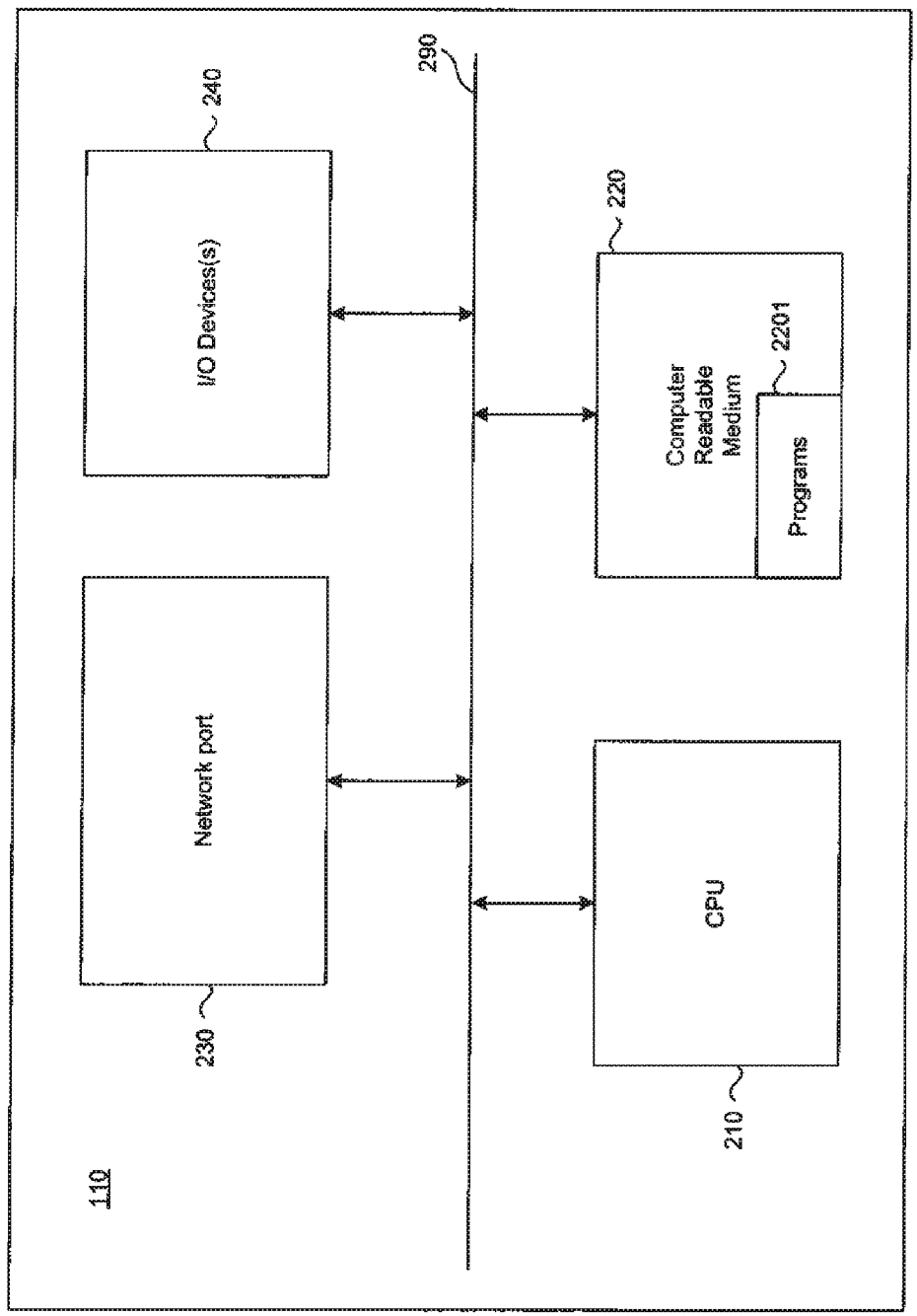
FIG. 2 illustrates a schematic block diagram of a platform for providing pseudo-anonymous video chat with intelligent matching of chat partners according to another embodiment(s) of the present disclosure.

FIG. 2 illustrates a schematic block diagram of a platform 110 for providing pseudo-anonymous video chat with intelligent matching of chat partners according to another embodiment(s) of the present disclosure. The platform 110 may include, but not limited to, one or more server computers. Each server computer may include at least a processor or a central processor unit ("CPU") 210, one or more network port 230, one or more input/output (I/O) devices 240 such as a keyboard, touch screen or other touch input device, a display, speakers, printer, a camera, a microphone etc., and one or more computer readable medium 220, all interconnected via one or more internal bus 290. Each server computer preferably may include an operating system, such as but not limited to Windows™, Linux™, or Unix™. The computer readable medium 220 may be any medium device that is configured to store data, such as a hard drive, RAM, ROM, flash memory, electrically erasable program read-only memory (EEPROM), CD-ROM, digital versatile disks (DVD), or the like.

Programs 2201 may be stored on one or more computer readable media 220. The programs 2201, when executed by the processor(s) 210, may cause the processor(s) 210 to perform certain operations. In some implementations, the operations may include, but not limited to, providing a plurality of users one or more interface(s) to generate user profiles, matching the users to potential chat partners according to a matching algorithm, monitoring users' conversation patterns, and providing one or more interface(s) for the users to call matched chat partners, modify the users' profiles in real time while video chat sessions are in progress, and rate chat partners while video chat sessions are in progress and/or after video chat sessions are concluded.

In some implementations, the operations may include providing one or more interface(s) for a user to generate a contact list or a buddy list that includes at least one pseudo-anonymous chat partner(s) that the user has given a favorable rating in the past.

In some implementations, the operations may include providing one or more interface(s) for the users to prioritize incoming calls according to the callers' status. For example, a caller's call may be given a high priority if the caller is on the user's contact list and/or the user has given the caller a favorable rating in the past. On the other hand, a caller's call may be blocked if the user has given an unfavorable rating to the caller in the past.

In some implementations, the operations may include providing one or more interface(s) for a user to share video(s) with a chat partner and/or view video(s) shared by the chat partner while the video chat session is in progress, and rate shared video(s) during and/or after the chat session.

Figure 3:
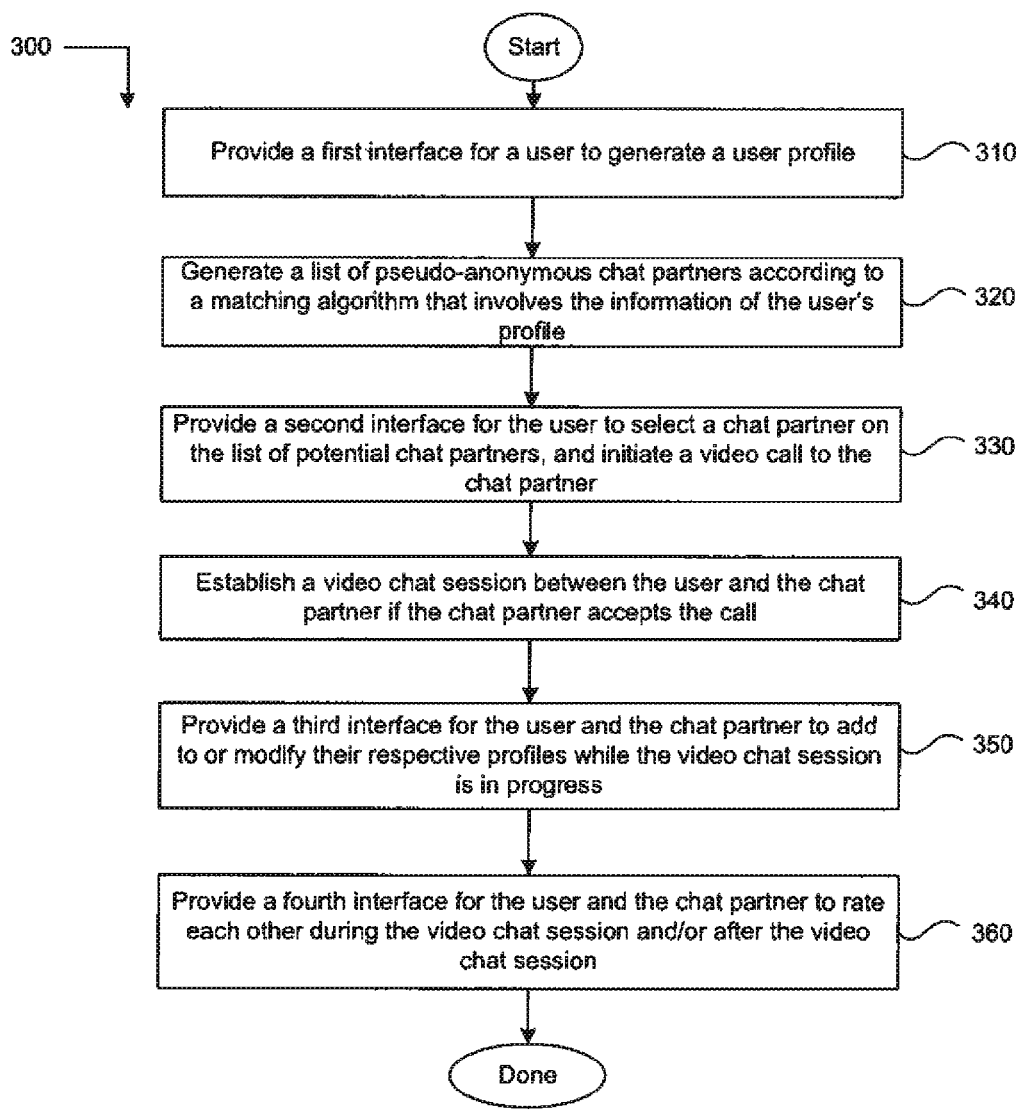
FIG. 3 illustrates a flow diagram of a process for providing pseudo-anonymous video chat with intelligent matching of chat partners according to yet another embodiment(s) of the present disclosure.

FIG. 3 illustrates a flow diagram of a process for providing pseudo-anonymous video chat with intelligent matching of chat partners according to yet another embodiment(s) of the present disclosure. At step 310, a first interlace may be provided to a user to generate or modify a user profile. At step 320, a list of pseudo-anonymous chat partners may be provided to the user. None of matched pseudo-anonymous chat partners is on the user's contact list The list of potential chat partners may be generated according to a matching algorithm. The matching algorithm may involve the information of the user's profile. A second interface may be provided for the user to select a chat partner from the list of potential chat partners and directly call the chat partner, step 330. A video chat session may be established between the user and the chat partner if the chat partner accepts the call, step 340.

At step 350, a third interface may be provided for the user and the chat partner to add to or modify their respective user profiles when the video chat session is in progress. A fourth interface may be provided for the user and the chat partner to rate each other during the video chat session and/or after the video chat session, step 360.

Figure 4A:
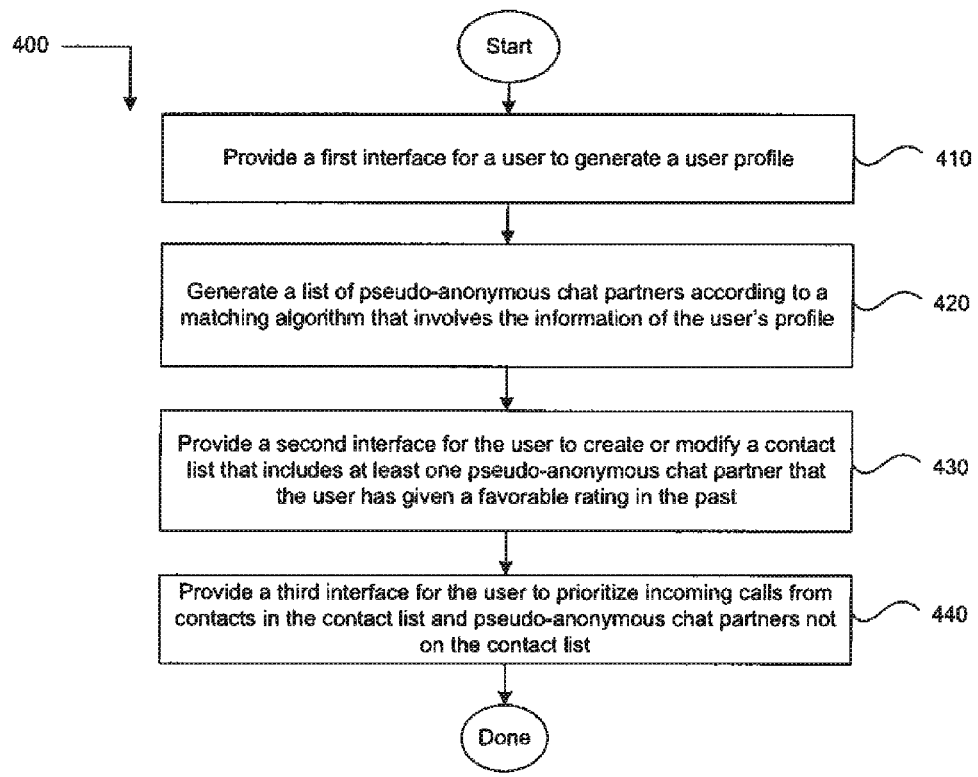
FIG. 4(a) illustrates a flow diagram of a process for managing pseudo-anonymous video chat according to yet another embodiment(s) of the present disclosure.

FIG. 4(a) illustrates a flow diagram of a process for managing pseudo-anonymous video chat according to yet another embodiment(s) of the present disclosure. At step 410, a first interface may be provided to a user to generate or modify a user profile. At step 420, the user may be provided a list of pseudo-anonymous chat partners, which may be generated according to a matching algorithm. The matching algorithm may involve the information of the user's profile. At step 430, a second interface may be provided for the user to create, modify, and/or organize a contact list. The contact list may include, but not limited to, at least one pseudo-anonymous chat partner that the user has given a favorable rating in the past. A third interface may be provided for the user to prioritize incoming call from contacts in the contact list and pseudo-anonymous chat partners not on the list.

In some implementations, by selecting a contact on the contact list, the user may be provided an option(s) to open a live video chat session to call the person. The live video chat session may be established between the user and the contact if the contact accepts the user's call. In some implementations, by selecting any name on the contact list, the user may be provided an option(s) to open an instant messaging session or a live video chat session or both. For example, the platform 110 may be configured to allow a user to send instant messages to another pseudo-anonymous user without establishing a live video chat session between them.

In some implementations, a contact list or a buddy list may be provided to a user to track user's friends and the pseudo-anonymous chat partners who have received a favorable rating from the user. The platform 110 may be configured to allow the user to modify the contact list or the buddy list at any time, and remove a pseudo-anonymous user from the contact list or the buddy list by directly deleting the contact from the list or "undoing" the rating of the pseudo-anonymous user to an unfavorable rating.

Figure 4B:
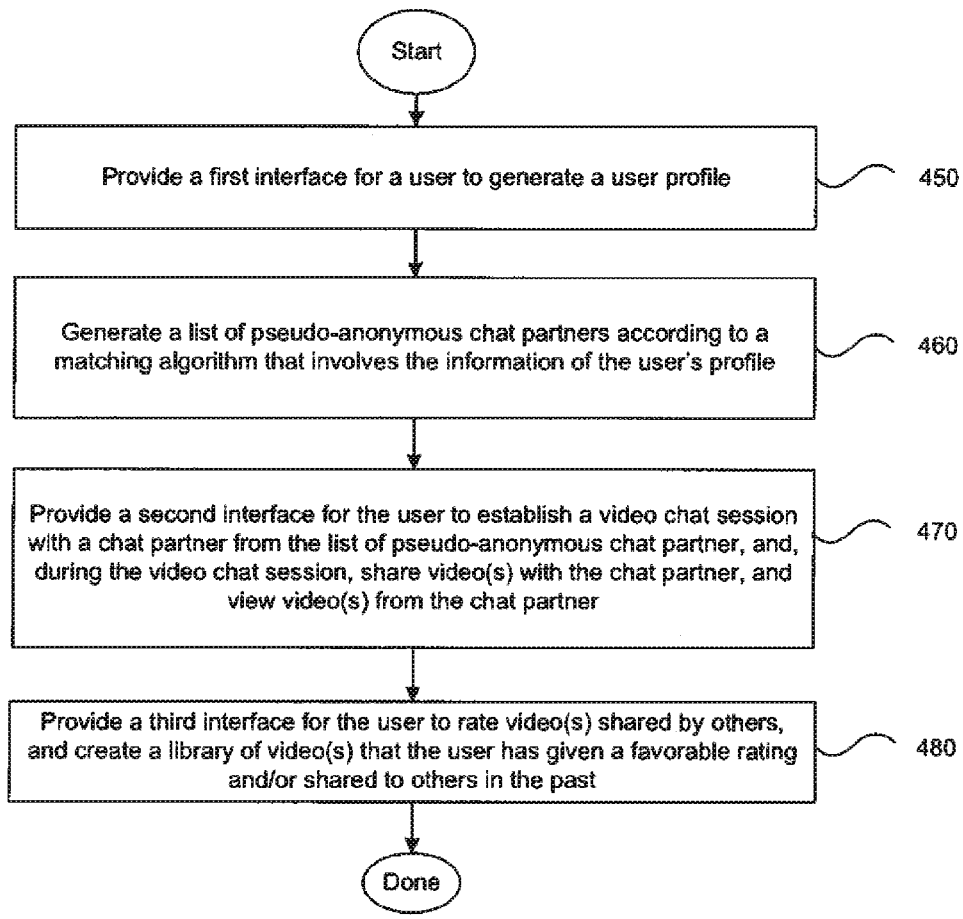
FIG. 4(b) illustrates a flow diagram of a process for sharing digital content between pseudo-anonymous users according to yet another embodiment(s) of the present disclosure.

FIG. 4(*b*) illustrates a flow diagram of a process for sharing digital content between pseudo-anonymous users according to yet another embodiment(s) of the present disclosure. At step 450, a first interface may be provided to a user to generate or modify a user profile. At step 460, the platform 110 may be configured to provide the user a list of pseudo-anonymous chat partners. The list of pseudo-anonymous chat partners may be generated according to a matching algorithm, which may involve the information of the user's profile.

At step 470, a second interface may be provided for the user to select a chat partner from the list of pseudo-anonymous chat partners, and call the chat partner. A live video chat session may be established if the chat partner accepts the user's call. During the chat session, the user may be provided an option(s) to share video(s) with the chat partner, view video(s) from the chat partner, and/or simultaneously share video with the chat partner while view video(s) from the chat partner. A third interface may be provided for the user to rate shared video(s), and create a library of video(s) that the user has given a favorable rating and/or shared with others in the past, step 480.

Figure 5:
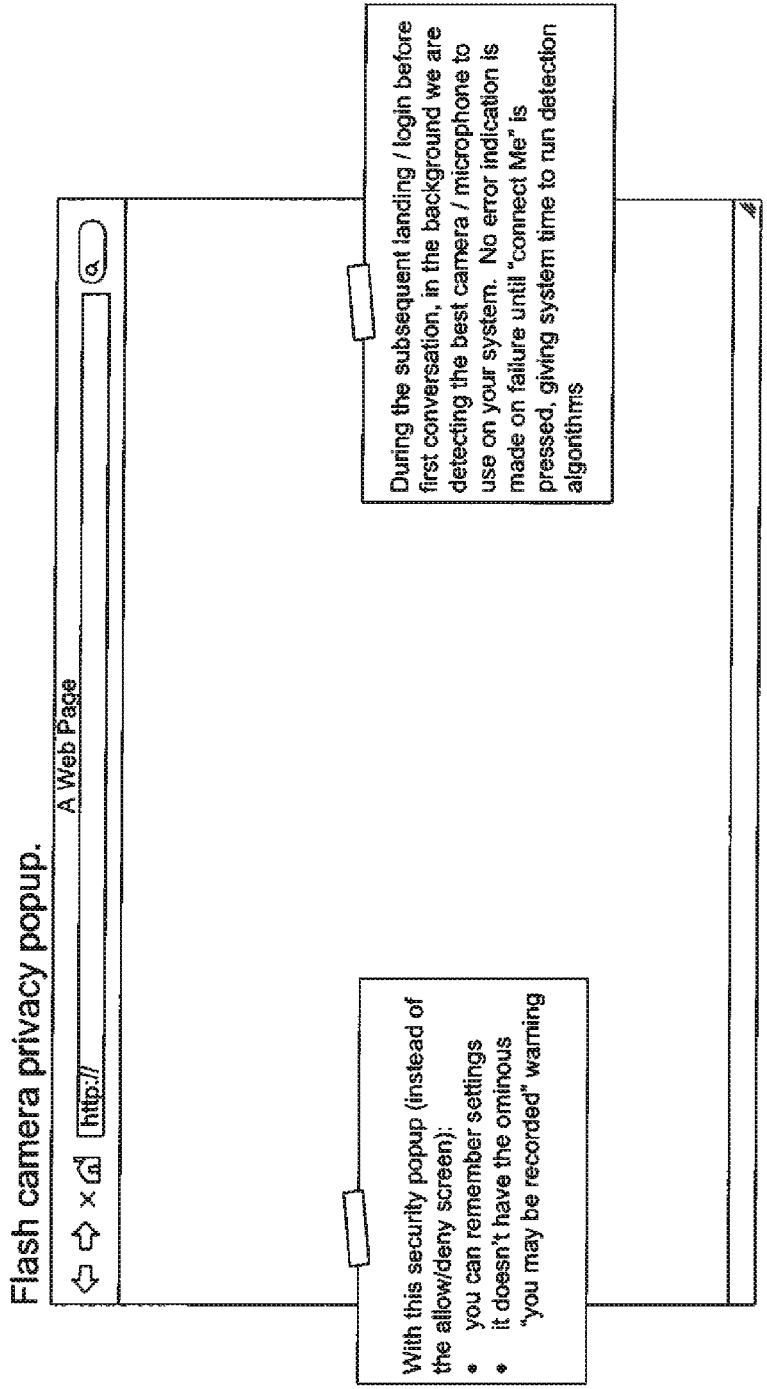
FIG. 5 illustrates an example of user interface showing the chat platform requesting access user's input devices (camera/microphone) to enable flash, according to yet another embodiment(s) of the present disclosure.

FIG. 5 illustrates an example of user interface showing the chat platform requesting access user's input devices (camera/microphone) to enable flash, according to yet another embodiment(s) of the present disclosure. The platform 110 may be configured to detect the best camera and microphone on the user's device in the background after a user's login. If a camera and a microphone are detected on the user device, the user may make video call(s) to other users without any interruption. On the other hand, if no camera or microphone is detected on the user device, an error message may be provided to the user when the user tries to make a video call.

In some implementations, the platform 110 may be configured to make a request to access the user's camera and microphone through Adobe Flash Player®. If the user allows the access, the platform 110 may be configured to monitor and record the user's activities.

Figure 6:
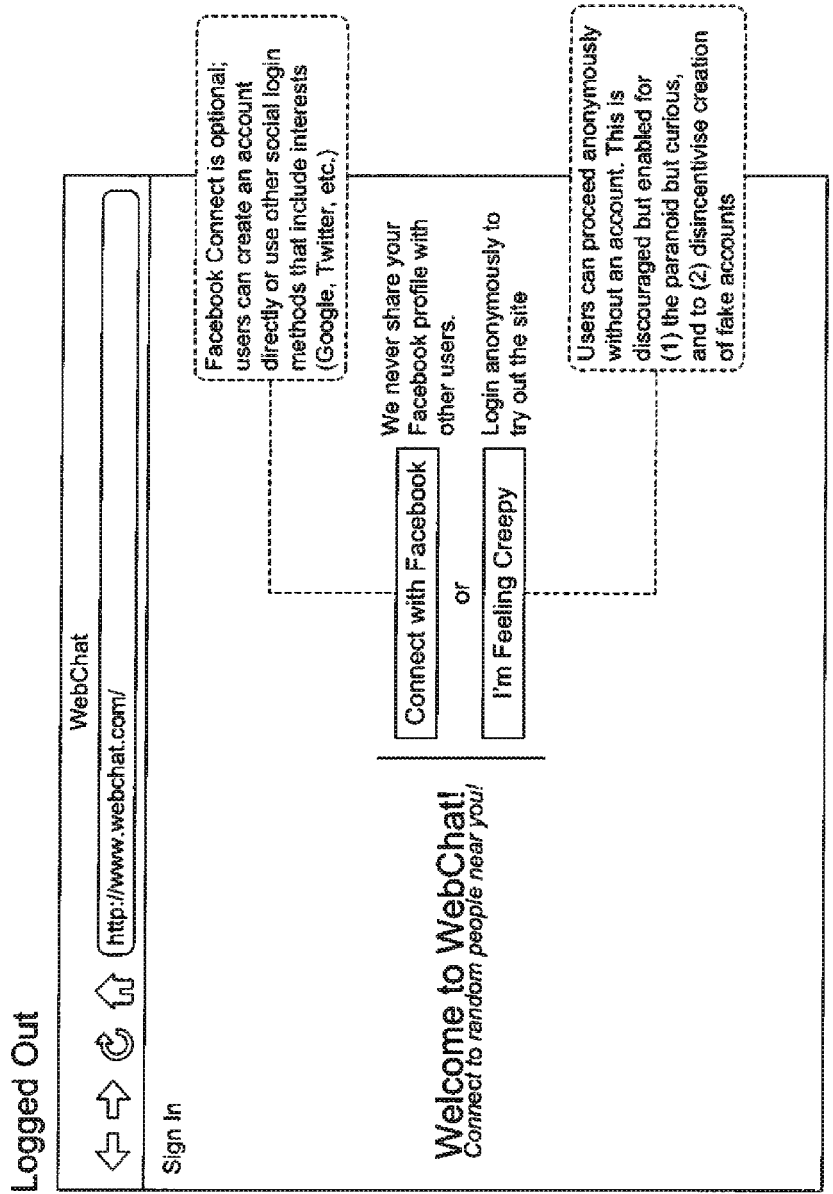
FIG. 6 illustrates an example of user interface of the chat platform prompting a user to log in and various options provided by the platform for a user to begin chat, according to yet another embodiment(s) of the present disclosure.

FIG. 6 illustrates an example of user interface of the chat platform prompting a user to log in and various options provided by the platform for a user to begin chat, according to yet another embodiment(s) of the present disclosure. A new user of the platform 110 may be prompted to create a user account. The user may be provided an option(s) to manually create a user profile in the platform 110. In some implementations, the user may be provided an option(s) to connect the user profile with the user's existing social media account(s), for example the user's Facebook® account and/or the user's Google® account. If the user chose to connect existing social media account(s), the platform 110 may be configured to automatically download the user's updates from user's connected social media account(s). For example, the user profile in the platform 110 may be automatically updated with new updates in user's Facebook® account.

For user protection, the platform 110 may be configured to keep a user's Facebook® profile, Google® profile, and/or other social media profiles as private/secret information of the user. The user profiles may be released to selected chat partner(s) only upon user's specific authorization(s).

In some implementations, the platform 110 may be configured to allow a user to proceed anonymously without any account. The user's physical location may be determined by Geolocation of the user device. Geolocation may be detected by the Internet Protocol (IP) address, MAC address, RFID, hardware embedded article/production number, embedded software number, invoice, Wi-Fi connection location, or device GPS coordinates, or other self disclosed information. The anonymous user may be randomly matched with other users in the vicinity of or neighborhood of the user's physical location.

Figure 7:
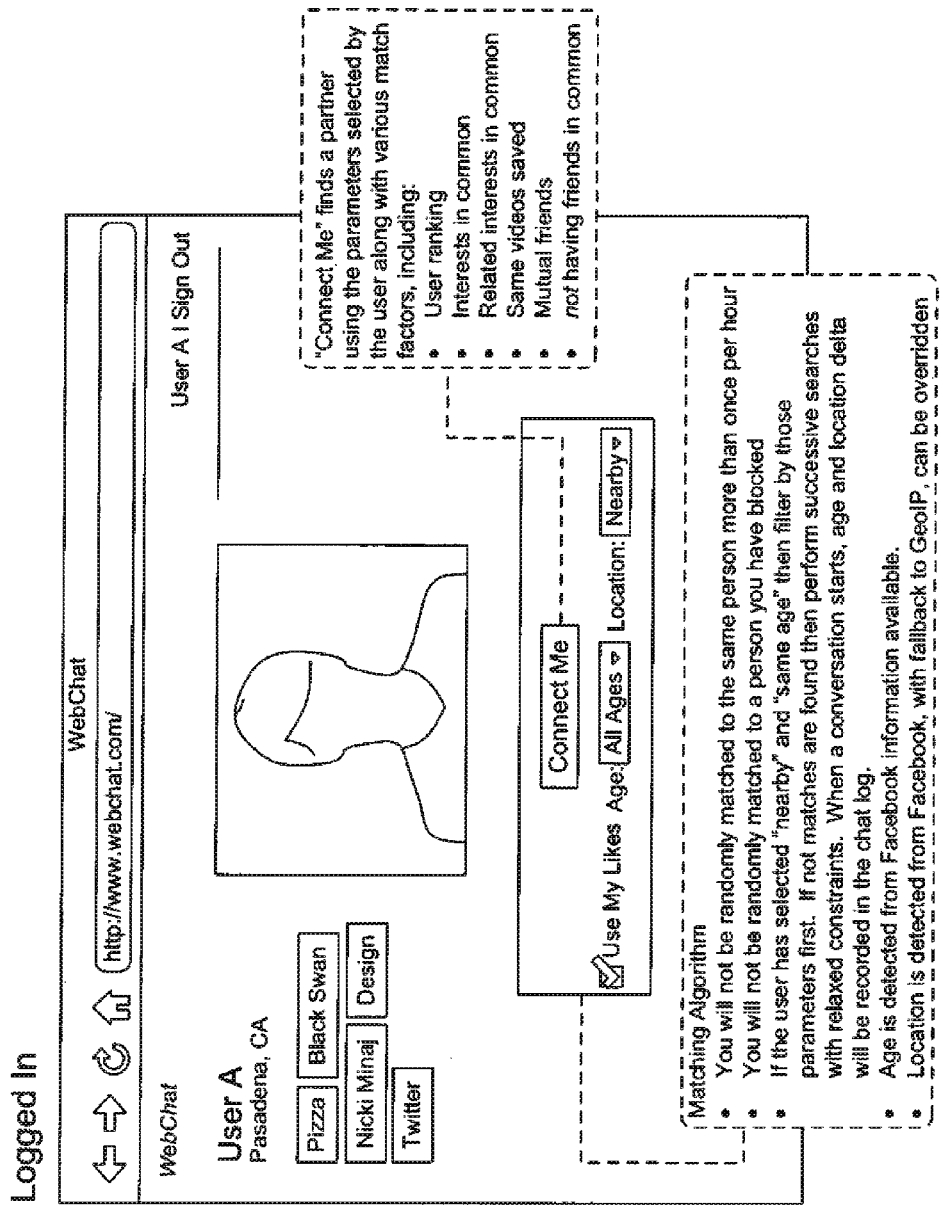
FIG. 7 illustrates an example of user interface of the chat platform enabling logged-in users to request a connection to another user in a chat session, according to yet another embodiment(s) of the present disclosure.

FIG. 7 illustrates an example of user interface of the chat platform enabling logged-in users to request a connection to another user in a chat session, according to yet another embodiment(s) of the present disclosure. In some implementations, the platform 110 may be configured to provide for each user a list of potential chat partners according to a matching algorithm. In some implementations, a plurality of factors may be considered under the matching algorithm. The factors may include, by way of example, but not limitation, user's ranking, common interests, related interests in common, thumbs-up the same videos in the past, sharing the same pseudo-anonymous chat partner(s) in contact list, duration of conversation, shared friends, mutual friending, taking of likes or videos, and not having friends in common. In some implementations, a user may be provided an option(s) to purchase points to improve its ranking.

In some implementations, a user may be provided an option(s) to manually select certain interest(s)/topic(s) as search criteria for potential chat partners. For example, if the user has interests to chat with a partner with the same age and living in the same area, the user may select "close to me" and "same age" as searching criteria for potential chat partners. The users' location and age may be detected from the user profile, and/or user's other accounts connected to the platform 110, such as Facebook® account and/or Google® account and/or other social media accounts. In some implementations, the user's location may be detected from the user device's Geolocation. In some implementations, the user's location may be manually set by the user.

A user may be provided an option(s) to select a contact in user's contact list or a matched pseudo-anonymous chat partner, and immediately initiate a video chat session with the person. The video chat session may be established if the person accepts the user's call and if there is no error message. An error message(s) may occur when there is a problem(s) preventing the video chat session from being established. For example, the error message may include, but not limited to, no video image on the user device, no supernode, and no audio. In the case of no audio, the user may be provided an option to skip audio.

Figure 8:
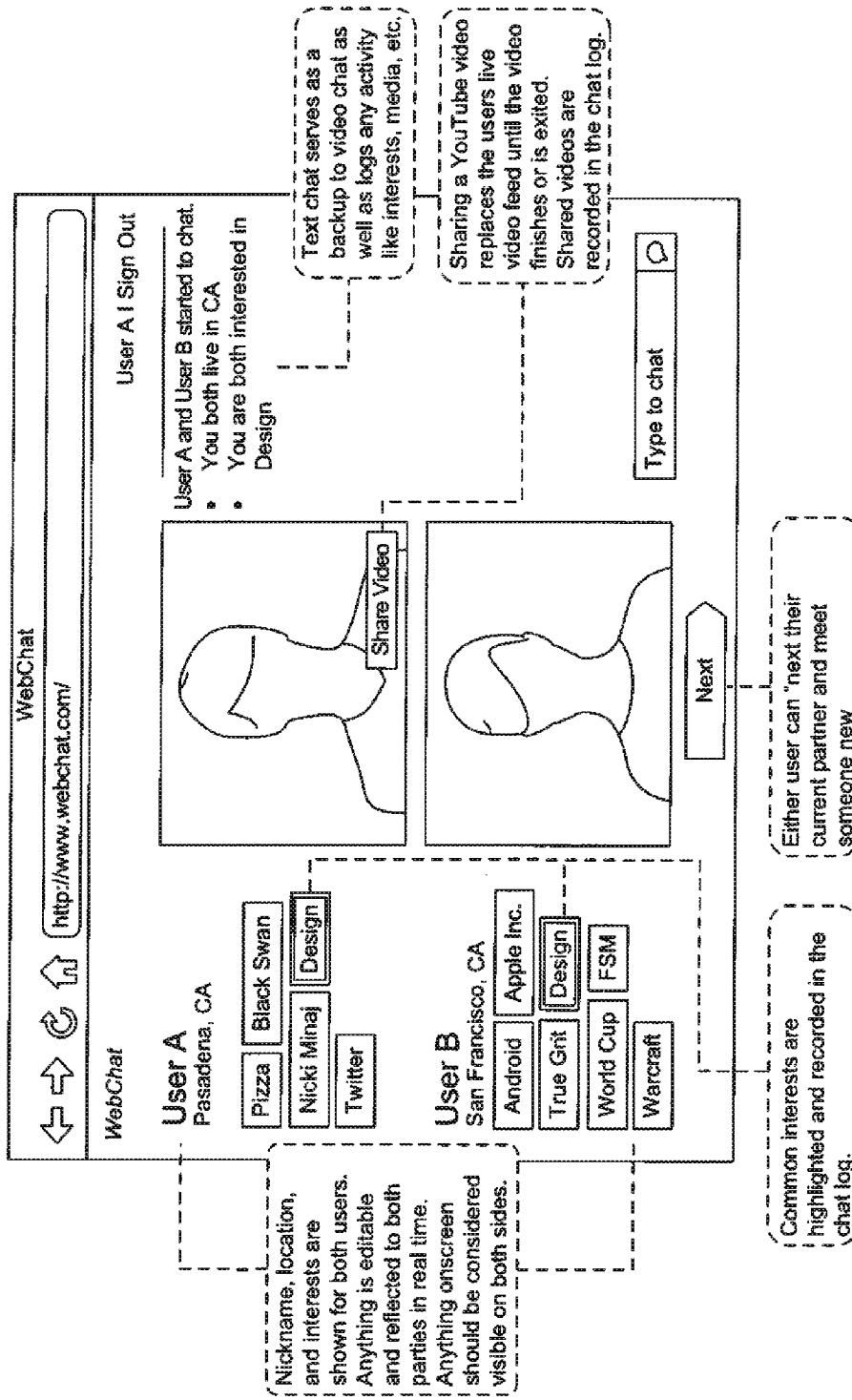
FIG. 8 illustrates an example of user interface of a video-chat session in the chat platform, according to yet another embodiment(s) of the present disclosure.

FIG. 8 illustrates an example of user interface of a video-chat session in the chat platform, according to yet another embodiment(s) of the present disclosure. The platform 110 may show, for example, nickname, location, and interest profile for chat participants if a video chart has been successfully established. The common interests shared by both users may be highlighted. Chat participants' commonalities and common interest(s) may be printed to a chat log. For example, User A and User B are both from California and have a common interest of design. The chat log may be printed "you both live in California," and "you are both interested in Design." In some implementations, text chat may serve as a backup to video chat as well as log any activity like interests, media, etc.

In some implementations, small fonts may be used to fit many interests/topics on the same screen. A vertical scrollbar may be provided for users to view additional interests not fitting on the same page. In some implementations, a user's interests/topics may be categorized according to their characteristics.

Figure 9:
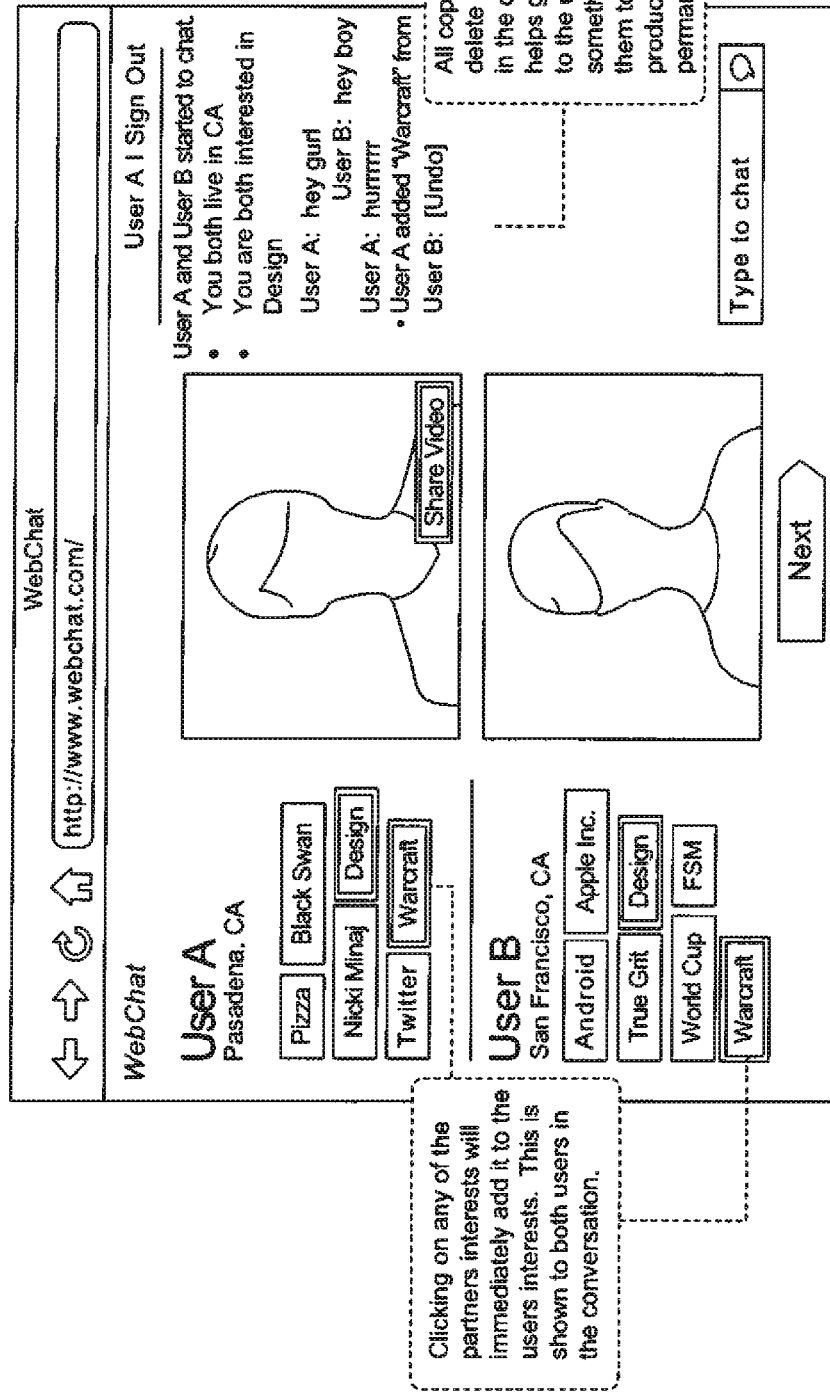
FIG. 9 illustrates an example of user interface of a video-chat session in the chat platform showing how the chat session can be directed to specific topics during the chat session based on respective interests of the chat participants, according to yet another embodiment(s) of the present disclosure.
Figure 10:
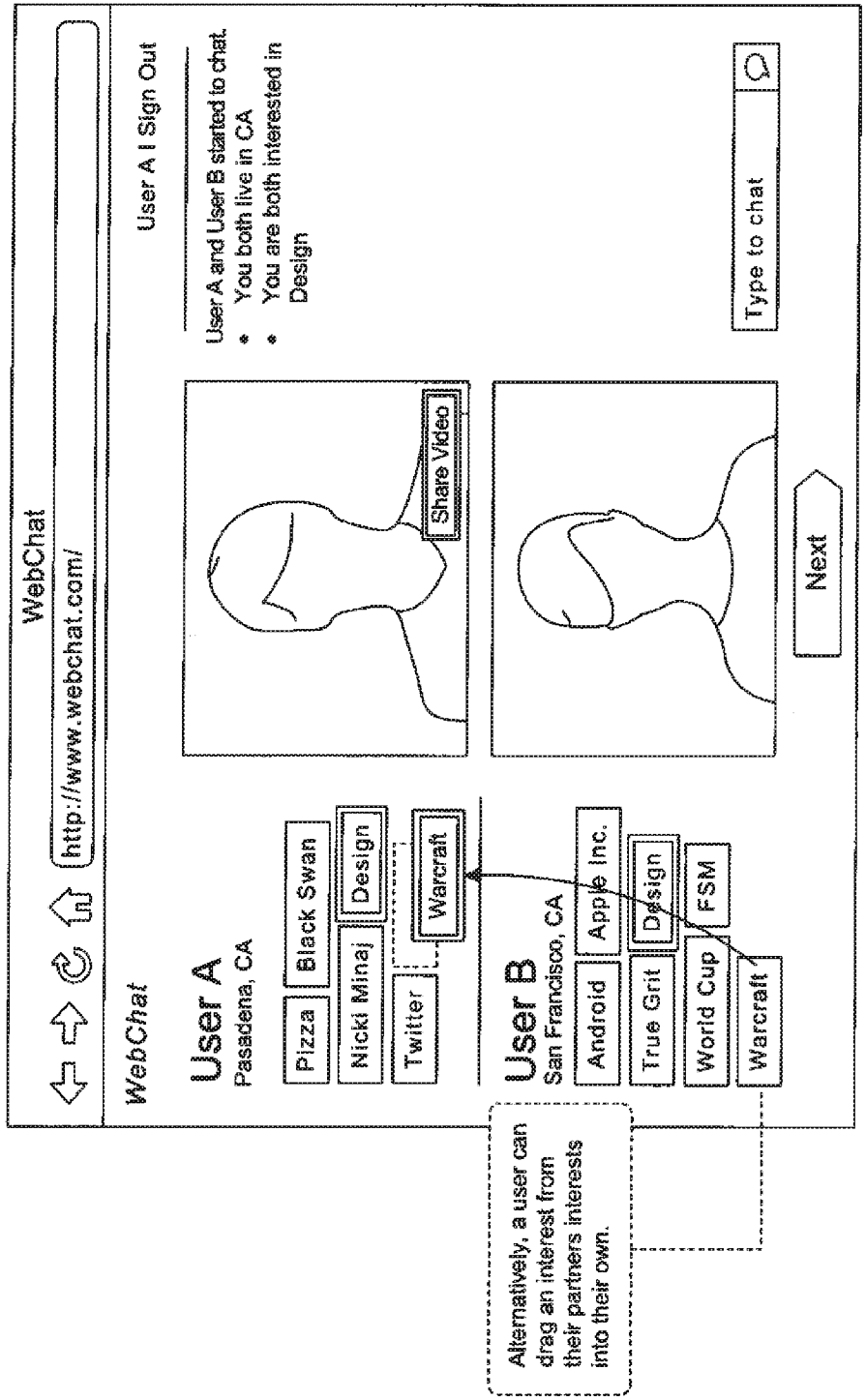
FIG. 10 illustrates another example of user interface of a video-chat session in the chat platform showing how the chat session can be directed to specific topics during the chat session based on respective interests of the chat participants, according to yet another embodiment(s) of the present disclosure.

FIGS. 9 and 10 illustrate examples of user interface of a video-chat session in the chat platform showing how the chat session can be directed to specific topics during the chat session based on respective interests of the chat participants, according to yet another embodiment(s) of the present disclosure. During a live chat session, participants may be provided an option(s) to highlight/magnify a remote interest, which is synchronized across both participants to focus on a particular interest or topic. In some implementations, chat participants may be provided an option(s) to copy a remote interest/topic as the user's local interest by clicking the interest/topic. In some implementations, chat participants may be provided an option(s) to select the plus sign at the end of the user's local profile to manually add in a new interest/topic. In some implementations, chat participants may be provided an option(s) to drag a remote interest/topic into local area to copy and insert it as the user's local interest, or drag any remote interest/topic directly into the user's profile. For example, User A may copy a remote interest/topic "Warcraft" in User B's profile as a local interest/topic by clicking the remote interest/topic "Warcraft" or dragging the remote interest/topic "Warcraft" directly into User A's profile. In some implementations, chat participants may be provided an option(s) to drag any local interests/topics to reorder them or throw them to trash bin.

In some implementations, the platform 110 may be configured to log any user's action to text log. For example, user A and user B are having a live video chat in the platform 110. The user A added an interest "Warcraft." Both users can see the activity on text log in real time. In some implementations, the platform 110 may be configured to log all copy, hide, and delete actions to text log. In some implementations, the platform 110 may be configured to provide an "undo" link associated with any action that a user may conduct in the platform 110. By double-clicking the "undo" link, the user may undo the action associated with the "undo" link.

Figure 11:
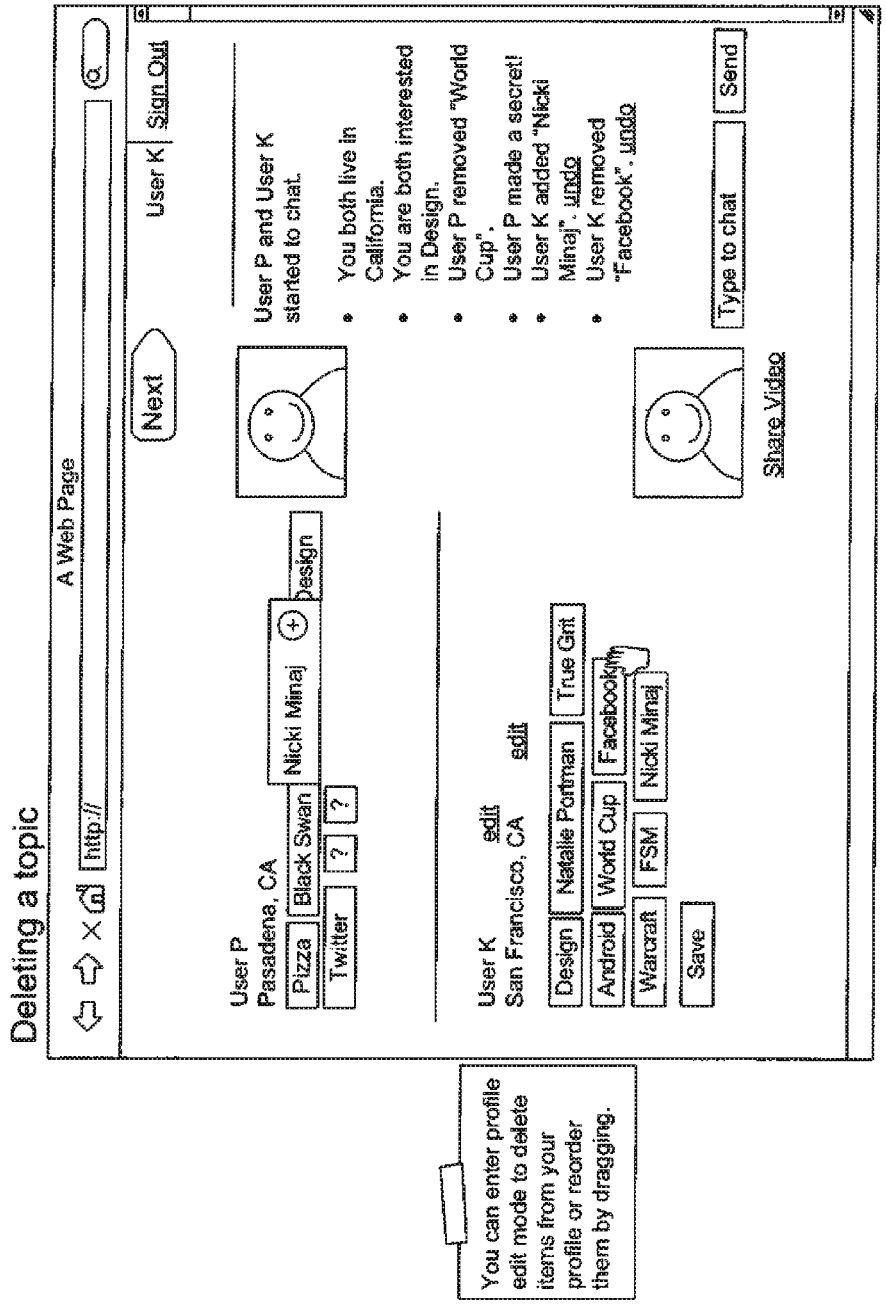
FIG. 11 illustrates an example of user interface of a video-chat session in the chat platform showing how interests/topics can be removed from a user profile, according to yet another embodiment(s) of the present disclosure.

FIG. 11 illustrates an example of user interface of a video-chat session in the chat platform showing how interests/topics can be removed from a user profile, according to yet another embodiment(s) of the present disclosure. In some implementations, the platform 110 may be configured to allow a user to enter into profile edit mode to delete items from the user profile or reorder items in the user profile by dragging and reordering them. For example, user P and user K are having a live video chat. The user K may enter into profile edit mode to delete Facebook® from the user K's profile. The platform 110 may be configured to print the user K's action to text log, "User K removed "Facebook," and an "undo" link associated with the action. The User K may undo his action by double-clicking the "undo" link.

Figure 12:
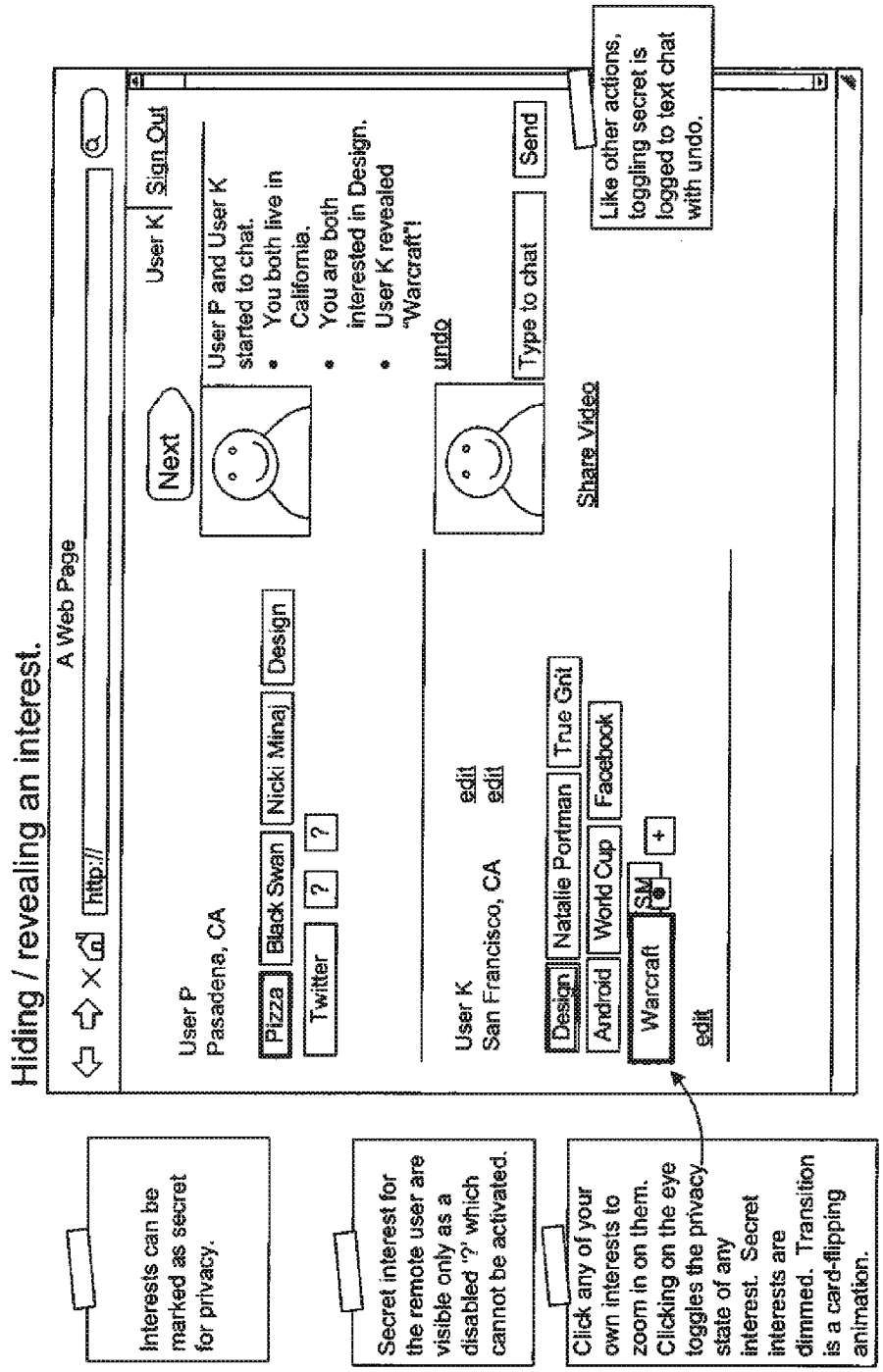
FIG. 12 illustrates an example of user interface of a video-chat session in the chat platform showing how interests/topics can be hidden and revealed selectively from a user profile or from being associated with the chat session, according to yet another embodiment(s) of the present disclosure.

FIG. 12 illustrates an example of user interlace of a video-chat session in the chat platform showing how interests/topics can be hidden and revealed selectively from a user profile or from being associated with the chat session, according to yet another embodiment(s) of the present disclosure. In some implementations, the platform 110 may be configured to provide an option(s) for users to designate some interests/topics as private interests/topics, Remote secret topics/interests may be dimmed with hidden text. For example, hidden text may be replaced with a question mark. Remote secret topics/interests may not be clicked or dragged by other users. A user may be provided an option(s) to toggle the visibility of a local topic/interest by selecting the local topic/interest. The transition of toggling may be seen by users in a video chat session as a card-flipping animation. When a topic/interest is toggled to a "secret" state, the topic/interest may be dimmed. In some implementations, toggling secret may be logged to text chat with "undo" associated with the action. For example, user K toggled topic "Warcraft" out of a "secret" state. The platform 110 may be configured to print the user K's action to text log, "User K revealed "Warcraft"!" with an "undo" link. The user K may undo the toggling by double-clicking the "undo" link.

FIG. 13 illustrates an example of user interface of a video-chat session in the chat platform which enables a new user in the chat session to specify their interests/topics or connect to an existing account through another service, according to yet another embodiment(s) of the present disclosure.

In some implementations, the platform 110 may be configured to match a user with chat partners according to a matching algorithm even though the user does not have a user profile.

In some implementations, the platform 110 may be configured to guide a new user into building up a user profile with interests/topics etc. so that better matched chat partners may be provided for the user according to the matching algorithm. A privacy popup may be shown to a first time user when adding interests/topics. In some implementations, an option may be provided for the new user to select visibility of newly added interest/topics. For example, the new user may be provided an option to choose a newly added interest/topic as either public, which is visible to other users, or secret, which is only visible to the user. In some implementations, the new user may be provided an option to set a default "public" or "secret" for all newly added interests/topics.

Figure 14:
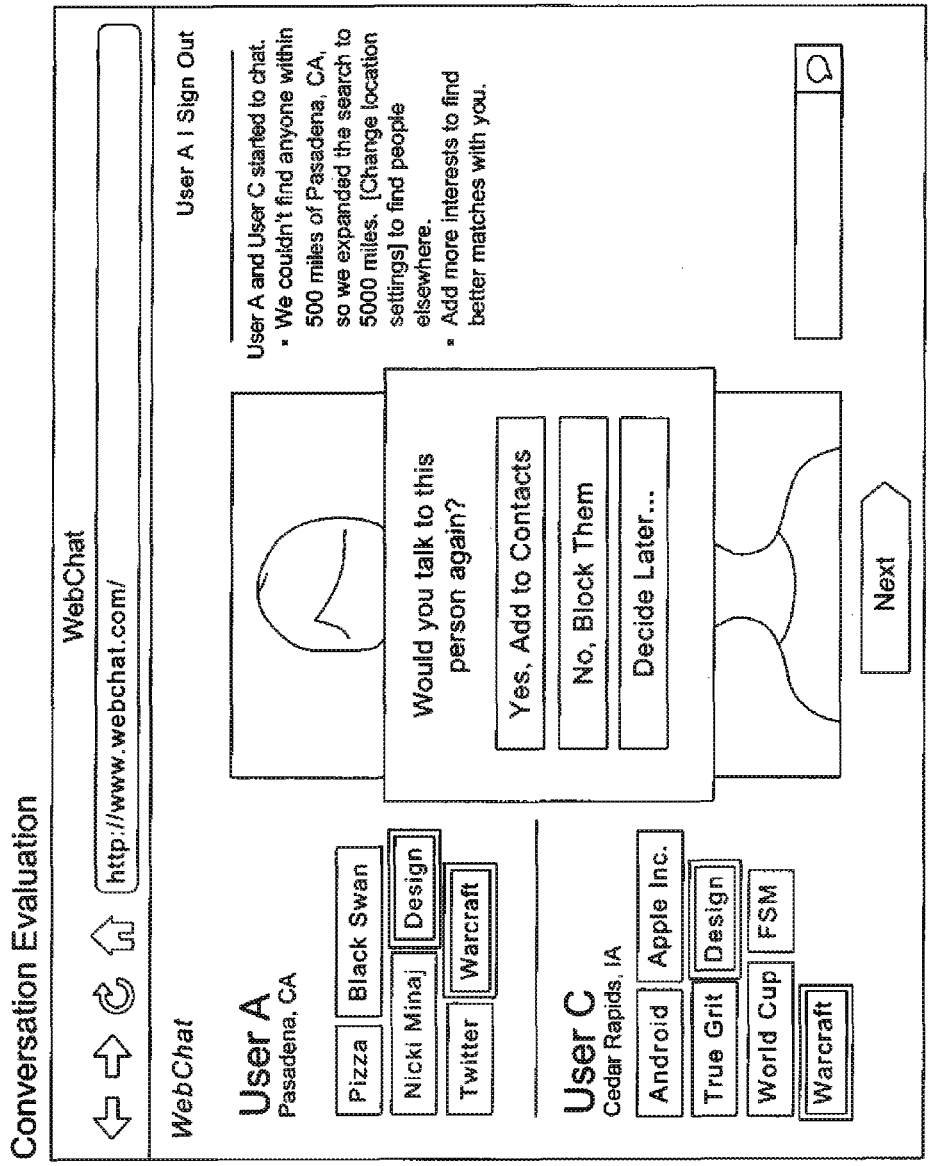
FIG. 14 illustrates an example of user interface of a video-chat session in the chat platform showing how users may evaluate a conversation with another user, for example, by rating or otherwise evaluating the chat partner, according to yet another embodiment(s) of the present disclosure.

FIG. 14 illustrates an example of user interface of a video-chat session in the chat platform showing how users may evaluate a conversation with another user, for example, by rating or otherwise evaluating the chat partner, according to yet another embodiment(s) of the present disclosure. The platform 110 may be configured to provide interface(s) for users to rate their chat partners during and/or after live video chat sessions. In some implementations, users may be provided an interface to "block," "report," or "like" chat partners during live video chat sessions. For example, a user may be provided an interface to choose whether the user would like to talk with a chat partner again, block the person, add as a friend, or decide later. In some implementations, the platform 110 may be configured to provide an interface for users to save favorable chat partner(s) in their contact lists. For example, a user may be provided a popup box with options, such as save the chat partner to a contact, block the chat partner, or decide later.

Figure 15A:
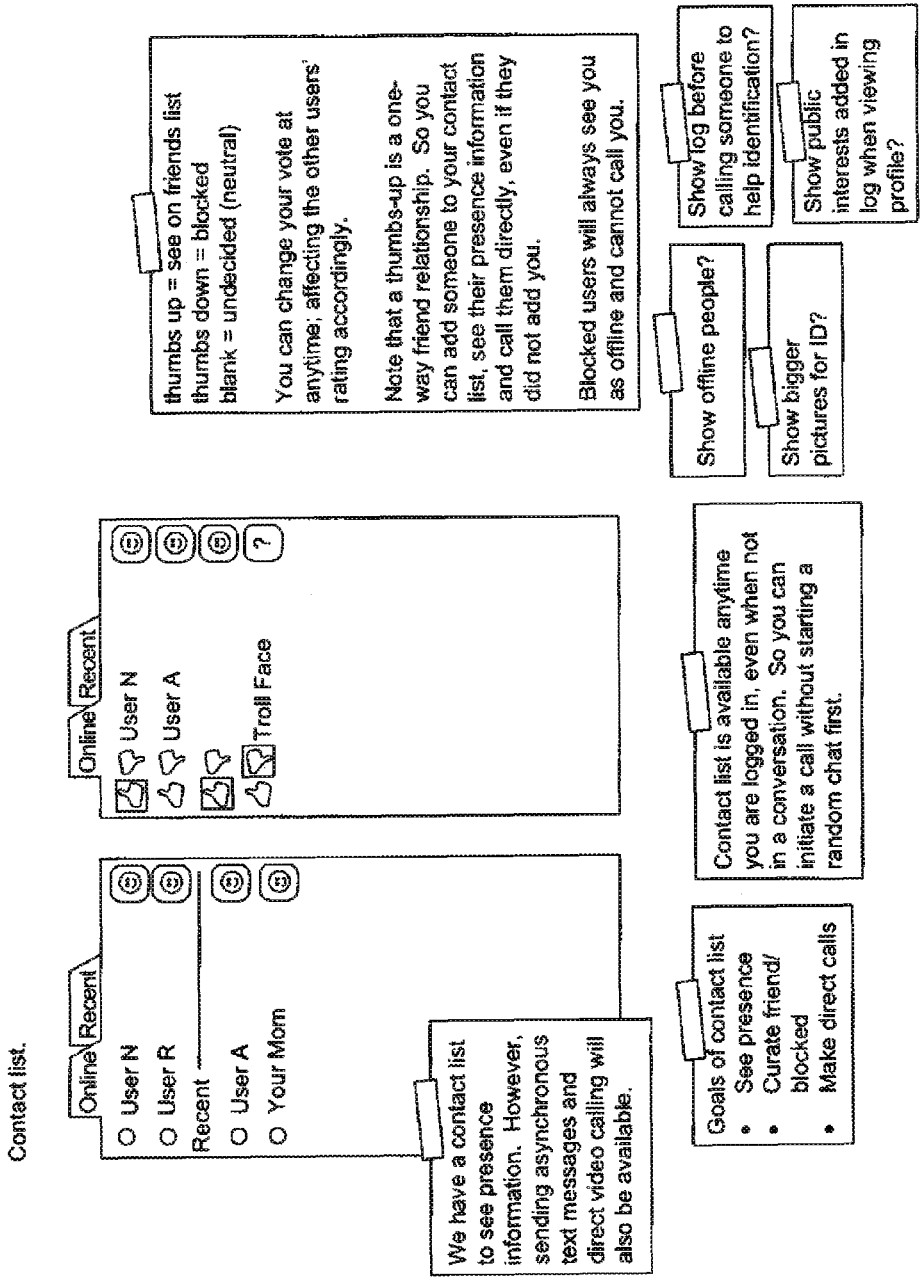
FIG. 15(a) illustrates an example of user interface in the chat platform showing example contact lists that a user may maintain and track ratings (e.g., previous chat experiences) of contacts or previous chat partners, according to yet another embodiment(s) of the present disclosure.

FIG. 15(a) illustrates an example of user interface in the chat platform showing example contact lists that a user may maintain and track ratings (e.g., previous chat experiences) of contacts or previous chat partners, according to yet another embodiment(s) of the present disclosure. The platform 110 may be configured to provide interface(s) for a user to generate and curate a contact list. The contact list may be available to the user anytime the user is logged in the platform 110. The platform 110 may be configured to allow the user to see the online status of all contacts on the user's contact list. For example, all online contacts may be highlighted for the user. The user may directly call an online contact by double-clicking the online contact.

In some implementations, a user may be provided an interface(s) to add a chat partner to a friend list by "thumb up" the chat partner or block a chat partner by "thumb down" the chat partner, or choose the status as undecided. The user may change the vote at anytime by clicking "undo" link associated with the previous vote. By adding a chat partner to the friend list, the user may see the presence information of the chat partner and call the chat partner directly. On the other hand, a blocked chat partner may always see the user as offline and may not call the user.

In some implementations, the platform 110 may be configured to allow a user to see previous log information of a selected chat partner to help identification before the user calls the chat partner. In some implementations, the platform 110 may be configured to allow a user to see public interests/ topics added in the log of the selected chat partner. In some implementations, a user may be provided an interface(s) to see offline people and/or bigger pictures for identification (ID).

In some implementations, two users may be provided an option(s) to add each other to their respective contact lists if they received "thumbs up" from each other. In some implementations, two users may be provided an option(s) to release their profile information to each other. Upon receiving authorizations from both users, the platform 110 may release the users' non-private profile information to each other, which may include, but not limited to, name, location, email address (es), and/or other profile information.

Figure 15B:
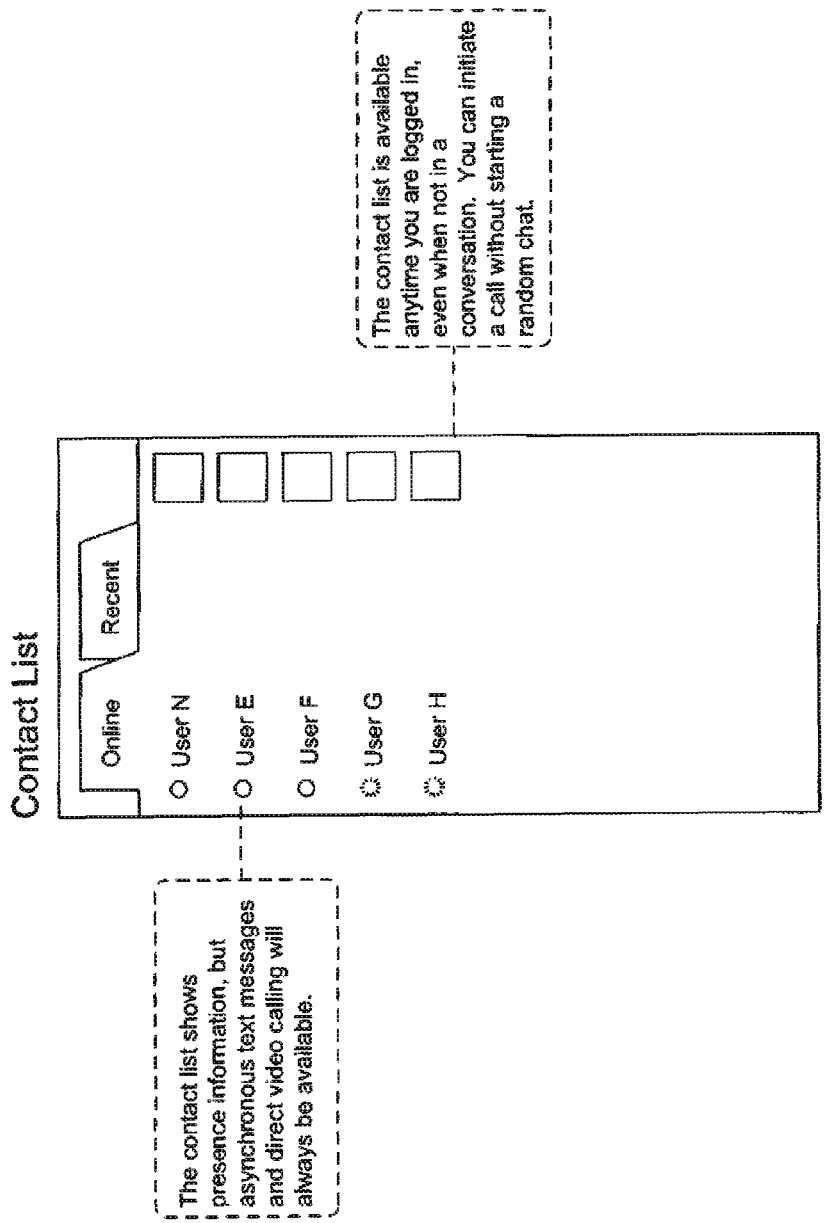
FIG. 15(b) illustrates another example of user interface in the chat platform showing example contact lists that a user may maintain and track previous chat partners, according to yet another embodiment(s) of the present disclosure.

FIG. 15(*b*) illustrates another example of user interface in the chat platform showing example contact lists that a user may maintain and track previous chat partners, according to yet another embodiment(s) of the present disclosure. In some implementations, the contact list may be configured to show presence information of all contacts. For example, online contact(s) may be highlighted while offline contact(s) may be dimmed. In some implementations, the contact list may be configured to allow users to send asynchronous text message(s) and/or make a direct video call(s) to contact(s) on the contact list.

In some implementations, the platform 110 may be configured to make the contact list available to a user immediately after the user's login. The user may initiate a video call without starting a random chat.

Figure 16:
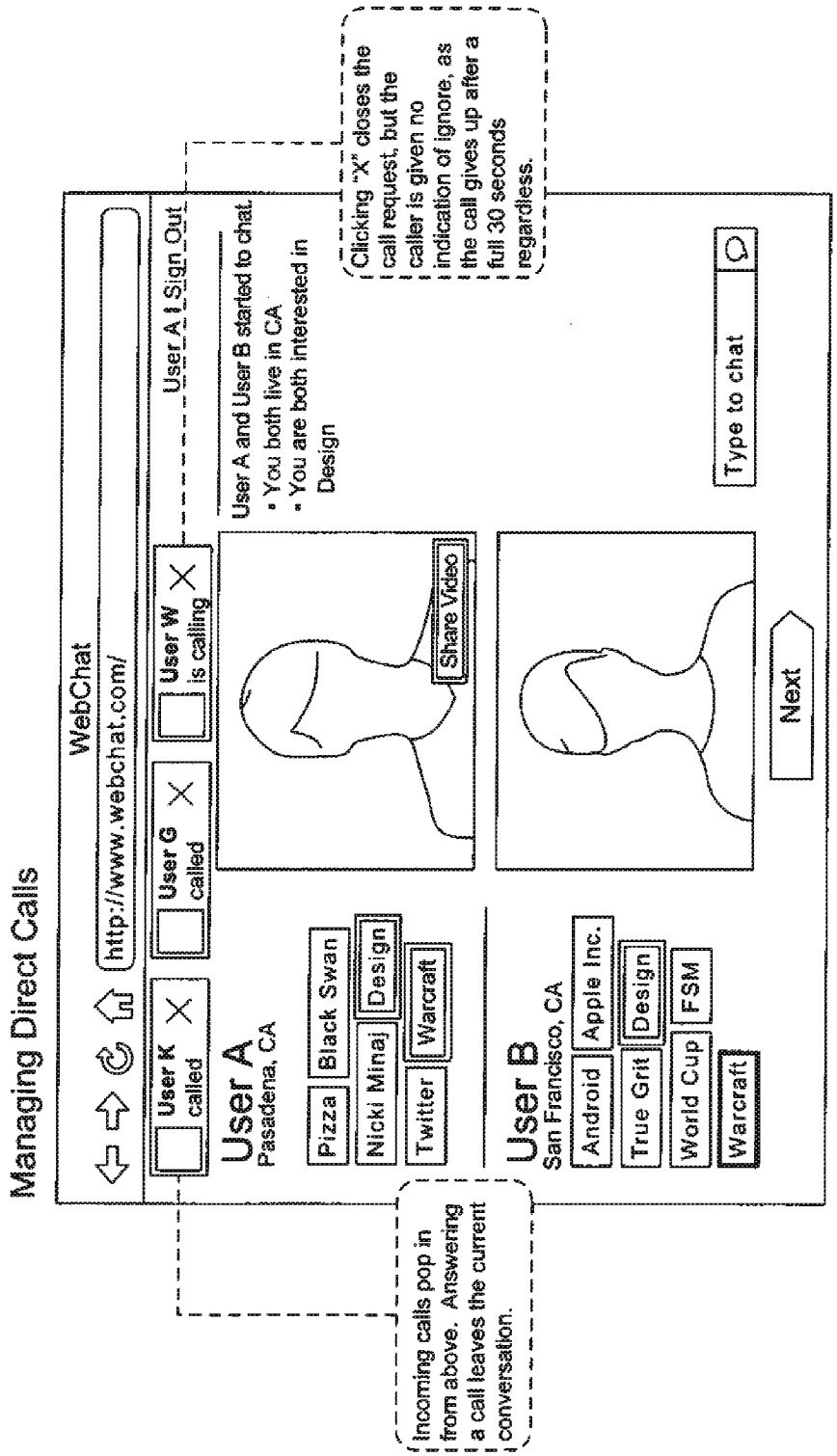
FIG. 16 illustrates an example of user interface in the chat platform showing example contact list that a user may manage incoming calls, according to yet another embodiment(s) of the present disclosure.

FIG. 16 illustrates an example of user interface in the chat platform showing example contact list that a user may manage incoming calls, according to yet another embodiment(s) of the present disclosure. The platform 110 may be configured to provide a popup box for a user when there is an incoming call from a contact or other pseudo-anonymous chat partner(s). The user may pick up the incoming call or ignore the call. By picking up the incoming call, the existing conversation between the user and other chat partner(s) may automatically be terminated. The user may ignore the incoming call by taking no action or clicking an "ignore" button in the popup box to collapse the box. The caller, on the other hand, may be given no indication that the user ignored the call since the call may give up after a fixed length of time or a fixed number of rings. For example, a user may click the close button of the popup box to collapse the box down to portrait like missed call.

In some implementations, the platform 110 may be configured to allow a user to accept an incoming call by selecting the portrait of the caller or reject the call by selecting a close button associated with the portrait. In some implementations, multiple calls may be made to a user simultaneously and may be answered by the user in any order regardless of time-sequence of the calls.

Figure 17:
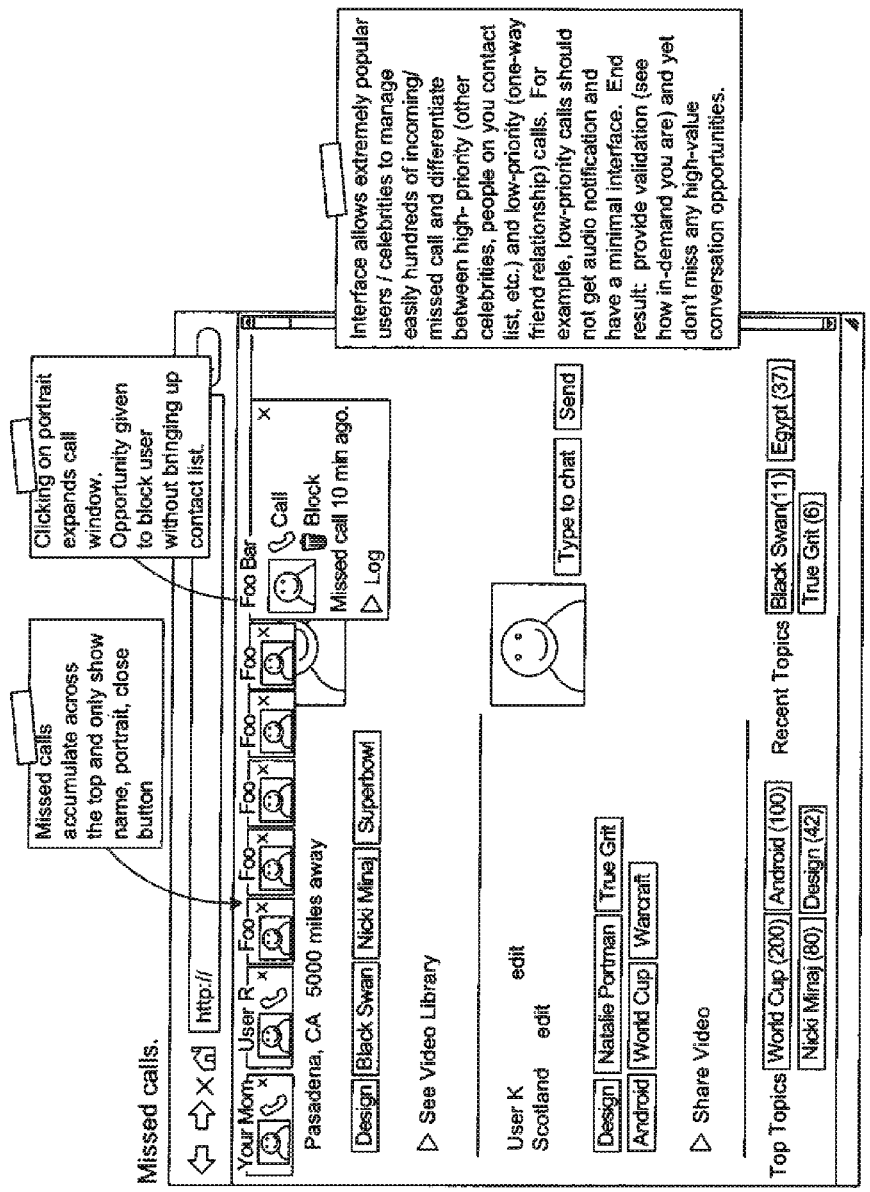
FIG. 17 illustrates another example of user interface in the chat platform showing example contact list that a user may manage incoming calls, according to yet another embodiment(s) of the present disclosure.

FIG. 17 illustrates another example of user interlace in the chat platform showing example contact list that a user may manage incoming calls, according to yet another embodiment (s) of the present disclosure. The platform 110 may be configured to provide an interface(s) for users to distinguish high priority calls from contacts in the contact list and other pseudo-anonymous users. For example, incoming calls from contacts may be provided with audio notifications and/or a popup box indicating the incoming calls. On the other hand, low priority calls may get no audio notification and have a minimal interface.

In some implementations, missed calls may be accumulated together on a user interface. The user may be showed, for example, the caller's name(s), portrait(s), and a close button associated with each portrait. The user may expand a portrait by clicking the portrait and be provided options to call or block the caller. The user may be able to see when the missed call was made and the caller's log information.

Figure 18:
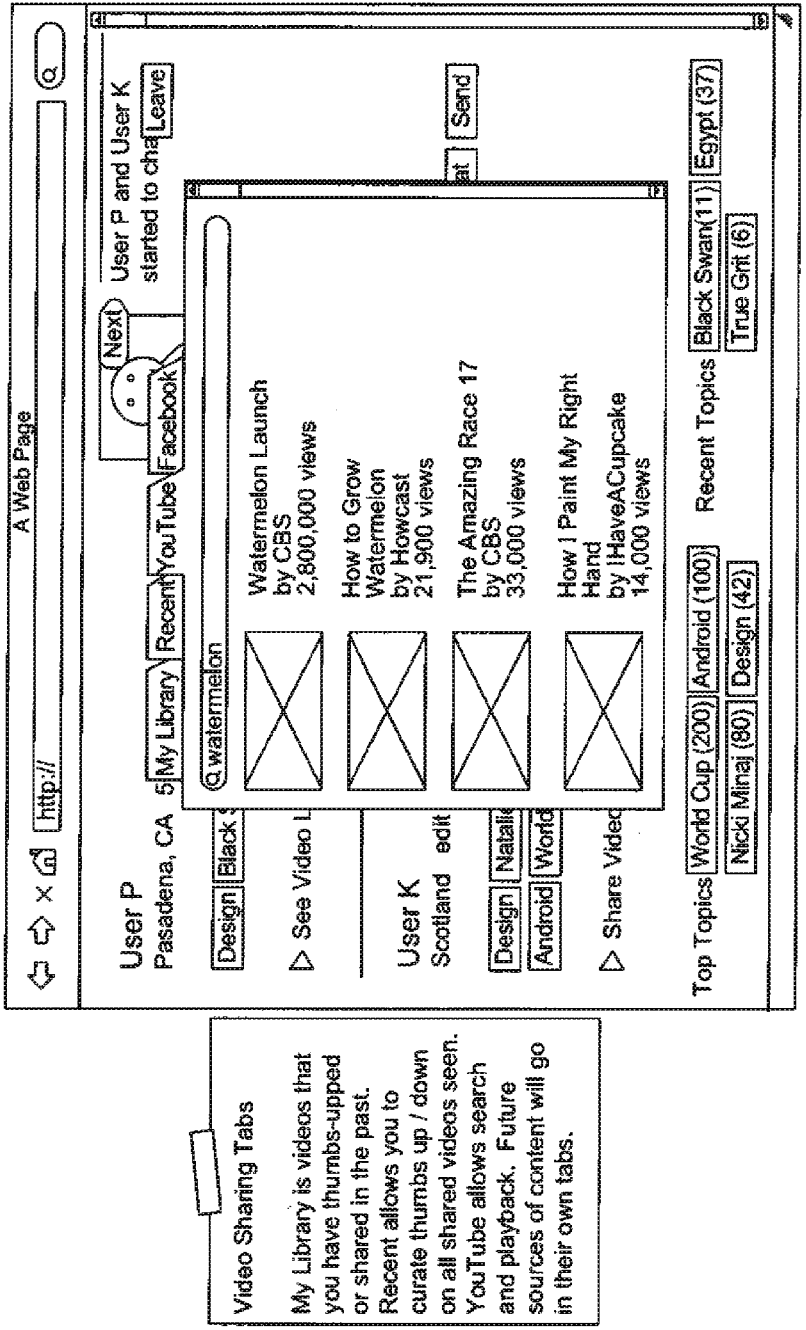
FIG. 18 illustrates an example of user interface in the chat platform showing example library that a user may manage shared videos, according to yet another embodiment(s) of the present disclosure.

FIG. 18 illustrates an example of user interface in the chat platform showing example library that a user may manage shared videos, according to yet another embodiment(s) of the present disclosure. The platform 110 may be configured to provide users an interface(s) to create and manage a library. The library may include videos that the users have voted "thumbs up" or shared with other chat partner(s) in the past. In some implementations, an option may be provided for the users to vote "thumbs up" or "thumbs down" on all shared videos that the users have seen. In some implementations, a YouTube® option may be provided for the users to search and/or playback all videos in the library. In some implementations, the users may be provided options to add new source(s) of content when the source(s) are identified.

In some implementations, a user may be provided an option(s) to replace or add to the user's own live camera feed with a video in the user library. In some implementations, a push to talk button may be provided for users to engage users own audio so that the echo doesn't go through the video being played.

Figure 19:
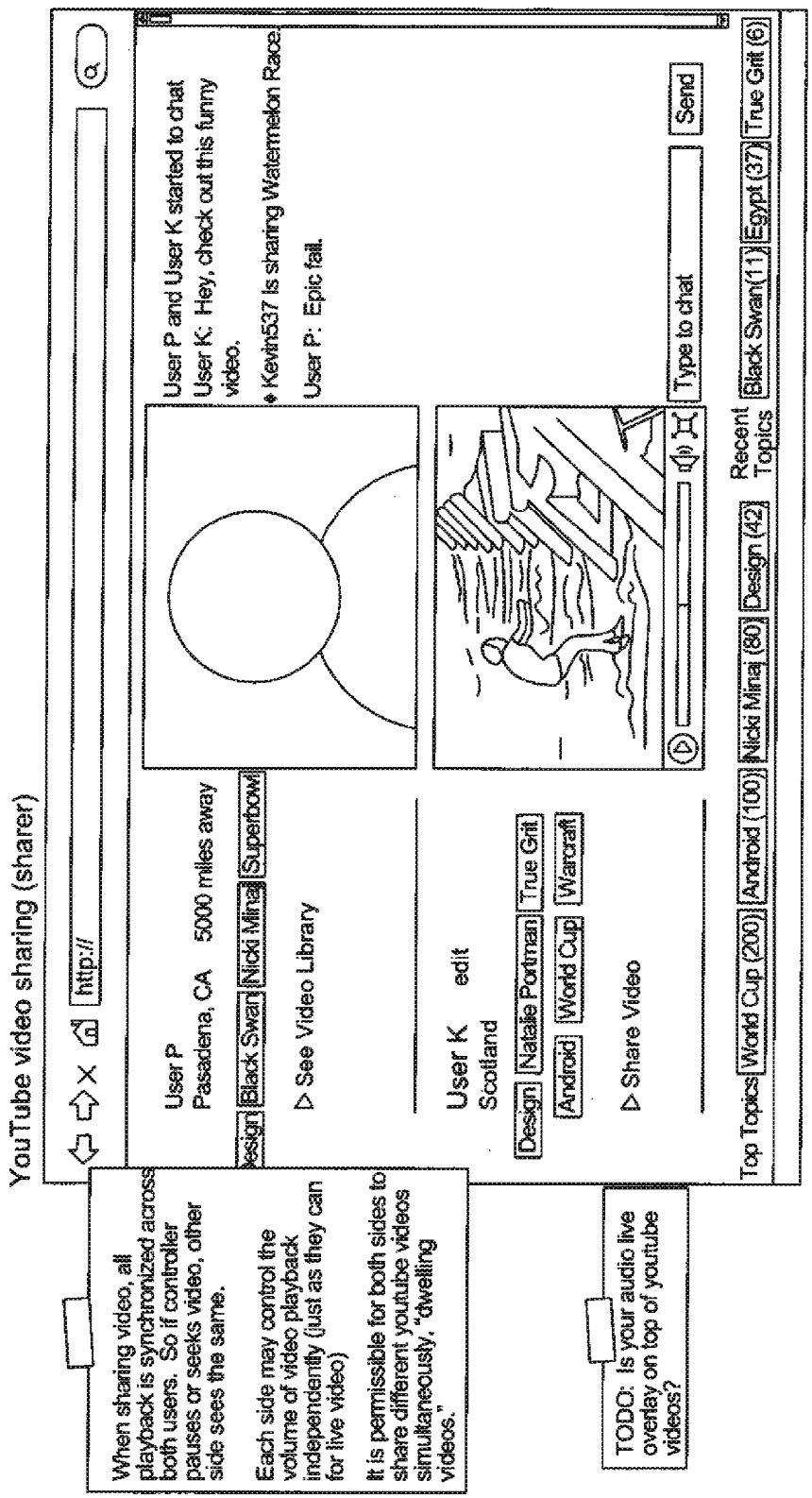
FIG. 19 illustrates an example of user interface in the chat platform showing video sharing functionalities, according to yet another embodiment(s) of the present disclosure.

FIG. 19 illustrates an example of user interface in the chat platform showing video sharing functionalities, according to yet another embodiment(s) of the present disclosure. The platform 110 may be configured to allow a user to share a video(s) with a chat partner(s) and/or view a video(s) from the chat partner(s). When a video(s) is shared by the user and the chat partner(s), all playbacks are synchronized across both users. Both sides may see the same thing when the sharing user/controller pauses or seeks video(s). Each side may be provided option(s) to control the volume of video playback independently. In some implementations, the platform 100 may be configured to provide an interface(s) for two users to share different videos simultaneously with each other.

In some implementations, the platform 110 may be configured to provide an interface(s) for remote users to rate shared videos. For example, remote users may be provided options, for example, "thumbs up," and "thumbs down." By voting "thumbs up" to a video, the user may add the video to the user's library. By voting "thumbs down" to a video, the user may ban the video from seeing it again. A remote user's voting action may be logged by the platform 110 to text chat with an "undo" link. A user may change the voting of a video by double-clicking the "undo" link associated with the user's voting action.

While the computer-readable medium is shown in an embodiment to be a single medium, the term "computer-readable medium" should be take to include single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limited the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method of managing video chats in a network, said network having a plurality of users, comprising:

providing a first interface for a user to generate a user profile, said first interface configured to allow said user to modify and/or add to said user profile;

generating a list of pseudo-anonymous chat partners from said plurality of users according to a matching algorithm that involves the information of said user profile;

providing a second interface for said user to select and initiate a video call to a chat partner on said list of pseudo-anonymous chat partners;

establishing a video chat session between said user and said chat partner if said chat partner accepts said video call;

providing a third interface for said user and said chat partner to add to and/or modify their respective profiles, wherein said profiles include one or more interest(s) and/or topic(s), and said third interface is configured to allow said user and/or said chat partner to drag and drop the said interest(s) and/or said topics from other's profile and/or manually add a new interest and/or topic in said user's profiles, while said video chat session is in progress; and providing a fourth interface for said user to rate said chat partner and said chat partner to rate said user during said video chat session and/or after said video chat session.

2. A method as recited in claim 1, wherein said first interface is configured to allow said user to connect said user profile with said user's Facebook® account and/or said user's Google® account, and said first interface is configured to automatically update said user profile with updates in said user's connected Facebook® account and/or said user's connected Google® account.

3. A method as recited in claim 1, wherein said matching algorithm is configured to allow said user to manually select search criteria for pseudo-anonymous chat partners.

4. A method as recited in claim 1, wherein said matching algorithm includes a scoring algorithm, said method further comprising: monitoring said user's chat behavior and said user's profile, assigning an affinity score to said user according to at least said user's conversation length with its chat partners; and generating a list of pseudo-anonymous chat partners, each of said pseudo-anonymous chat partners having the same affinity score or a similar affinity score as that of said user.

5. A method as recited in claim 1, wherein said matching algorithm is based on one or more factors including: user's ranking, interests in common, related interests in common, giving a favorable rating to the same pseudo-anonymous chat partner(s) in the past, thumb-up to the same videos in the past, or having no friends in common on Facebook® or other social media.

6. A method as recited in claim 5, wherein said matching algorithm is dynamically constructed or expanded using machine learning algorithm.

7. A method as recited in claim 1, further comprising logging an action of said user to text log, text log of said action associated with an undo link, said undo link configured to allow said user to undo said action.

8. A method as recited in claim 1, wherein said third interface is configured to highlight common interest(s) and/or common topic(s) between said user and said chat partner.

9. A method as recited in claim 8, wherein the icon size of said interest(s) and/or said topic(s) in said user's profile is indicative of the frequency of their appearance as common interest(s) and/or common topic(s) in said user's live chat sessions.

10. A method as recited in claim 1, wherein said interest(s) and/or topic(s) are categorized according to their characteristics.

11. A method as recited in claim 1, further comprising: examining said user's profile to select one or more advertisements to be displayed to the user according to at least a subset of said user's profile; and displaying, on one or more said interface(s), the selected one or more advertisements to said user.

12. A method as recited in claim 1, further comprising: receiving location information and status information from said user's device, said location information representing a geolocation of said user.

13. An apparatus for managing video chats in a social network, said network having a plurality of users, comprising:
one or more processors, and
instructions encoded in one or more computer readable media; wherein said instructions when executed in a platform featuring said one or more processors, cause said platform to perform operations comprising:
providing a first interface for a user to generate a user profile, said first interface configured to allow said user to modify and/or add to said user profile;
generating a list of pseudo-anonymous chat partners from said plurality of users according to a matching algorithm that involves the information of said user profile;
providing a second interface for said user to select and initiate a video call to a chat partner on said list of pseudo-anonymous chat partners;
establishing a video chat between said user and said chat partner if said chat partner accepts said video call;
providing a third interface for said user and said chat partner to add to and/or modify their respective profiles while said video chat session is in progress, wherein said profiles include one or more interest(s) and/or topic(s), and said third interface is configured to allow said user and/or said chat partner to drag and drop the said interest(s) and/or said topics from other's profile and/or manually add a new interest and/or topic in said user's profiles, while said video chat session is in progress; and
providing a fourth interface for said user to rate said chat partner and said chat partner to rate said user during said video chat session and/or after said video chat session.

14. An apparatus recited in claim 13, wherein said first interface is configured to allow said user to connect said user profile with said user's Facebook® account and/or said user's Google® account, and said first interface is configured to automatically update said user profile with updates in said user's connected Facebook® account and/or said user's connected Google® account.

15. An apparatus recited in claim 13, wherein said matching algorithm is configured to allow said user to manually select search criteria for pseudo-anonymous chat partners.

16. An apparatus recited in claim 13, wherein said matching algorithm includes a scoring algorithm, and said method further comprises: monitoring said user's chat behavior and said user's profile, assigning an affinity score to said user according to at least said user's conversation length with its chat partners; and generating a list of pseudo-anonymous chat partners, each of said pseudo-anonymous chat partners having the same affinity score or a similar affinity score as that of said user.

17. An apparatus recited in claim 13, wherein said matching algorithm is based on one or more factors including: user's ranking, interests in common, related interests in common, giving a favorable rating to the same pseudo-anonymous chat partner(s) in the past, thumb-up to the same videos in the past, or having no friends in common on Facebook® or other social media.

18. An apparatus recited in claim 17, wherein said matching algorithm is dynamically constructed or expanded using machine learning algorithm.

19. An apparatus recited in claim 13, wherein said operations further comprises: logging an action of said user to text log, text log of said action associated with an undo link, said undo link configured to allow said user to undo said action.

20. An apparatus recited in claim 13, wherein said third interface is configured to highlight common interest(s) and/or common topic(s) between said user and said chat partner.

21. An apparatus recited in claim 20, wherein the icon size of said interest(s) and/or said topic(s) in said user's profile is indicative of the frequency of their appearance as common interest(s) and/or common topic(s) in said user's live chat sessions.

22. An apparatus recited in claim 13, wherein said interest(s) and/or topic(s) are categorized according to their characteristics.

23. An apparatus recited in claim 13, wherein said operations further comprises: examining said user's profile to select one or more advertisements to be displayed to the user according to at least a subset of said user's profile; and displaying, on one or more said interface(s), the selected one or more advertisements to said user.

24. An apparatus recited in claim 13, wherein said operations further comprises: receiving location information and status information from said user's device, said location information representing a geolocation of said user.

25. A computer-implemented method of managing video chats in a social network, said network having a plurality of users, comprising:
providing a first interface for a user to generate a user profile, said first interface configured to allow said user and a chat partner to modify and/or add to their respective profile, wherein said profiles include one or more interest(s) and/or topic(s), and said first interface is configured to allow said user and/or said chat partner to drag and drop the said interest(s) and/or said topics from other's profile and/or manually add a new interest and/or topic in said user's profiles, while a video chat session is in progress;
generating a list of pseudo-anonymous chat partners from said plurality of users according to a matching algorithm that involves the information of said user profile, wherein said pseudo-anonymous chat partners are not on said user's contact list;
providing a second interface for said user to create and/or modify a contact list, said contact list including one or more said pseudo-anonymous chat partners that said user has given a favorable rating in the past; and
providing a third interface for said user to prioritize incoming calls from contacts on said contact list and pseudo-anonymous chat partners not on said contact list.

26. A method as recited in claim 25, wherein said first interface is configured to allow said user to connect said user profile with said user's Facebook® account and/or said user's Google® account, and said first interface is configured to automatically update said user profile with updates in said user's connected Facebook® account and/or said user's connected Google® account.

27. A method as recited in claim 25, wherein said matching algorithm is configured to allow said user to manually select search criteria for pseudo-anonymous chat partners.

28. A method as recited in claim 25, wherein said matching algorithm includes a scoring algorithm, said method further comprising: monitoring said user's chat behavior and said user's profile, assigning an affinity score to said user according to at least said user's conversation length with its chat partners; and generating a list of pseudo-anonymous chat partners, each of said pseudo-anonymous chat partners having the same affinity score or a similar affinity score as that of said user.

29. A method as recited in claim 25, wherein said matching algorithm is based on one or more factors including: user's ranking, interests in common, related interests in common, giving a favorable rating to the same pseudo-anonymous chat partner(s) in the past, thumb-up to the same videos in the past, or having no friends in common on Facebook® or other social media.

30. A method as recited in claim 29, wherein said matching algorithm is dynamically constructed or expanded using machine learning algorithm.

31. A method as recited in claim 25, further comprising logging an action of said user to text log, text log of said action associated with an undo link, said undo link configured to allow said user to undo said action.

32. A method as recited in claim 25, further comprising: examining said user's profile to select one or more advertisements to be displayed to the user according to at least a subset of said user's profile; and displaying, on one or more said interface(s), the selected one or more advertisements to said user.

33. A method as recited in claim 25, further comprising: receiving location information and status information from said user's device, said location information representing a geolocation of said user.

34. A method as recited in claim 25, where said third interface is configured to provide audio notification and a popup box to said user when an incoming call is a high priority call.

35. A method as recited in claim 25, where said third interface is configured to show said user a list of missed call(s) and provide said user at least the information including missed caller(s)' name(s), portrait, and a close button associated with each portrait.

36. A method as recited in claim 35, where said third interface is configured to allow said user to call or block said caller(s) by selecting a call option or a block option associated with each said portrait.

37. An apparatus for managing video chats in a social network, said network having a plurality of users, comprising:
one or more processors, and
instructions encoded in one or more computer readable media; wherein said instructions when executed in a platform featuring said one or more processors, cause said platform to perform operations comprising:
providing a first interface for a user to generate a user profile, said first interface configured to allow said user and a chat partner to modify and/or add to their respective profile, wherein said profiles include one or more interest(s) and/or topic(s), and said first interface is configured to allow said user and/or said chat partner to drag and drop the said interest(s) and/or said topics from other's profile and/or manually add a new interest and/or topic in said user's profiles, while a video chat session is in progress;
generating a list of pseudo-anonymous chat partners from said plurality of users according to a matching algorithm that involves the information of said user profile, wherein said pseudo-anonymous chat partners are not on said user's contact list;
providing a second interface for said user to create and/or modify a contact list, said contact list including one or more said pseudo-anonymous chat partners that said user has given a favorable rating in the past; and
providing a third interface for said user to prioritize incoming calls from contacts on said contact list and pseudo-anonymous chat partners not on said contact list.

38. An apparatus as recited in claim 37, wherein said first interface is configured to allow said user to connect said user profile with said user's Facebook® account and/or said user's Google® account, and said first interface is configured to automatically update said user profile with updates in said user's connected Facebook® account and/or said user's connected Google® account.

39. An apparatus as recited in claim 37, wherein said matching algorithm is configured to allow said user to manually select search criteria for pseudo-anonymous chat partners.

40. An apparatus as recited in claim 37, wherein said matching algorithm includes a scoring algorithm, and said operations further comprises: monitoring said user's chat behavior and said user's profile, assigning an affinity score to said user according to at least said user's conversation length with its chat partners; and generating a list of pseudo-anonymous chat partners, each of said pseudo-anonymous chat partners having the same affinity score or a similar affinity score as that of said user.

41. An apparatus as recited in claim 37, wherein said matching algorithm is based on one or more factors including: user's ranking, interests in common, related interests in common, giving a favorable rating to the same pseudo-anonymous chat partner(s) in the past, thumb-up to the same videos in the past, or having no friends in common on Facebook® or other social media.

42. An apparatus as recited in claim 41, wherein said matching algorithm is dynamically constructed or expanded using machine learning algorithm.

43. An apparatus as recited in claim 37, wherein said operations further comprises: logging an action of said user to text log, text log of said action associated with an undo link, said undo link configured to allow said user to undo said action.

44. An apparatus as recited in claim 37, wherein said operations further comprises: examining said user's profile to select one or more advertisements to be displayed to the user according to at least a subset of said user's profile; and displaying, on one or more said interface(s), the selected one or more advertisements to said user.

45. An apparatus as recited in claim 37, wherein said operations further comprises: receiving location information and status information from said user's device, said location information representing a geolocation of said user.

46. An apparatus as recited in claim 37, where said third interface is configured to provide audio notification and a popup box to said user when an incoming call is a high priority call.

47. An apparatus as recited in claim 37, where said third interface is configured to show said user a list of missed call(s), and provide said user at least the information including missed caller(s)' name(s), portrait(s), and a close button associated with each portrait.

48. An apparatus as recited in claim 47, where said third interface is configured to allow said user to call or block said caller(s) by selecting a call option or a block option associated with each said portrait.

49. A computer-implemented method of sharing digital content in a social network, said network having a plurality of users, comprising:
  providing a first interface for a user to generate a user profile, said first interface configured to allow said user and a chat partner to modify and/or add to their respective profile, wherein said profiles include one or more interest(s) and/or topic(s), and said first interface is configured to allow said user and/or said chat partner to drag and drop the said interest(s) and/or said topics from other's profile and/or manually add a new interest and/or topic in said user's profiles, while a video chat session is in progress;
  generating a list of potential chat partners from said plurality of users according to a matching algorithm that involves the information of said user profile, wherein said potential chat partners are not on said user's contact list;
  providing a second interface for a user to share video(s) with a chat partner on said list of potential chat partners, and view video(s) from said chat partner while a video chat session between said user and said chat partner is in progress; and
  providing a third interface for said user to rate video(s) shared by other users, and create a library with video(s) that said user has given a favorable rating and/or shared with other users in the past.

50. A method as recited in claim 49, wherein said first interface is configured to allow said user to connect said user profile with said user's Facebook® account and/or said user's Google® account, and said first interface is configured to automatically update said user profile with updates in said user's connected Facebook® account and/or said user's connected Google® account.

51. A method as recited in claim 49, wherein said matching algorithm is configured to allow said user to manually select search criteria for said potential chat partners.

52. A method as recited in claim 49, wherein said matching algorithm includes a scoring algorithm, said method further comprising: monitoring said user's chat behavior and said user's profile, assigning an affinity score to said user according to at least said user's conversation length with its chat partners; and generating a list of potential chat partners, each of said potential chat partners having the same affinity score or a similar affinity score as that of said user.

53. A method as recited in claim 49, wherein said matching algorithm is based on one or more factors including: user's ranking, interests in common, related interests in common, giving a favorable rating to the same pseudo-anonymous chat partner(s) in the past, thumb-up to the same videos in the past, or having no friends in common on Facebook® or other social media.

54. A method as recited in claim 53, wherein said matching algorithm is dynamically constructed or expanded using machine learning algorithm.

55. A method as recited in claim 49, further comprising logging an action of said user to text log, text log of said action associated with an undo link, said undo link configured to allow said user to undo said action.

56. A method as recited in claim 49, further comprising: examining said user's profile to select one or more advertisements to be displayed to the user according to at least a subset of said user's profile; and displaying, on one or more said interface(s), the selected one or more advertisements to said user.

57. A method as recited in claim 49, further comprising: receiving location information and status information from said user's device, said location information representing a geolocation of said user.

58. A method as recited in claim 49, where said second interface is configured to synchronize all playbacks of said video(s) across both said user and said chat partner, and provide independent volume control of said playbacks for both said user and said chat partner.

59. A method as recited in claim 49, where said second interface is configured to allow said user and said chat partner to share different videos simultaneously with each other.

60. A method as recited in claim 49, where said second interface is configured to provide a push to talk button for said user to engage said user's audio without letting the echo go through said video(s) being played.

61. An apparatus for managing video chats in a social network, said network having a plurality of users, comprising:
  one or more processors, and
  instructions encoded in one or more computer readable media; wherein said instructions when executed in a platform featuring said one or more processors, cause said platform to perform operations comprising:
    providing a first interface for a user to generate a user profile, said first interface configured to allow said user and a chat partner to modify and/or add to their respective profile, wherein said profiles include one or more interest(s) and/or topic(s), and said first interface is configured to allow said user and/or said chat partner to drag and drop the said interest(s) and/or said topics from other's profile and/or manually add a new interest and/or topic in said user's profiles, while a video chat session is in progress;

generating a list of potential chat partners from said plurality of users according to a matching algorithm that involves the information of said user profile, wherein said potential chat partners are not on said user's contact list;

providing a second interface for a user to share video(s) with a chat partner on said list of potential chat partners, and view video(s) from said chat partner while a video chat session between said user and said chat partner is in progress; and providing a third interface for said user to rate video(s) shared by other users, and create a library with video(s) that said user has given a favorable rating and/or shared with other users in the past.

62. A method as recited in claim 61, wherein said first interface is configured to allow said user to connect said user profile with said user's Facebook® account and/or said user's Google® account, and said first interface is configured to automatically update said user profile with updates in said user's connected Facebook® account and/or said user's connected Google® account.

63. A method as recited in claim 61, wherein said matching algorithm is configured to allow said user to manually select search criteria for said potential chat partners.

64. A method as recited in claim 61, wherein said matching algorithm includes a scoring algorithm, and said operations further comprises: monitoring said user's chat behavior and said user's profile, assigning an affinity score to said user according to at least said user's conversation length with its chat partners; and generating a list of potential chat partners, each of said potential chat partners having the same affinity score or a similar affinity score as that of said user.

65. A method as recited in claim 61, wherein said matching algorithm is based on one or more factors including: user's ranking, interests in common, related interests in common, giving a favorable rating to the same pseudo-anonymous chat partner(s) in the past, thumb-up to the same videos in the past, or having no friends in common on Facebook® or other social media.

66. A method as recited in claim 65, wherein said matching algorithm is dynamically constructed or expanded using machine learning algorithm.

67. A method as recited in claim 61, wherein said operations further comprises: logging an action of said user to text log, text log of said action associated with an undo link, said undo link configured to allow said user to undo said action.

68. A method as recited in claim 61, wherein said operations further comprises: examining said user's profile to select one or more advertisements to be displayed to the user according to at least a subset of said user's profile; and displaying, on one or more said interface(s), the selected one or more advertisements to said user.

69. A method as recited in claim 61, wherein said operations further comprises: receiving location information and status information from said user's device, said location information representing a geolocation of said user.

70. A method as recited in claim 61, where said second interface is configured to synchronize all playbacks of said video(s) across both said user and said chat partner, and provide independent volume control of said playbacks for both said user and said chat partner.

71. A method as recited in claim 61, where said second interface is configured to allow said user and said chat partner to share different videos simultaneously with each other.

72. A method as recited in claim 61, where said second interface is configured to provide a push to talk button for said user to engage said user's audio without letting the echo go through said video(s) being played.

73. A computer-implemented method of managing video chats in a network, said network having a plurality of users, comprising:

providing an interface for a user and a chat partner to add to and/or modify their respective profiles, wherein said profiles include one or more interest(s) and/or topic(s), and said interface is configured to allow said user and said chat partner to copy, drag/drop, delete, hide and/or reveal one or more said interest(s) and/or said topics from other's profile and/or manually add a new interest and/or topic in said user's profiles, while a video chat session is in progress, and wherein remote hidden interests and/or topics can be dimmed with hidden text and cannot be clicked or dragged.

\* \* \* \* \*